(12) United States Patent
Kamata

(10) Patent No.: US 8,125,852 B2
(45) Date of Patent: Feb. 28, 2012

(54) METHODS AND SYSTEMS FOR SEISMIC SIGNAL DETECTION

(75) Inventor: Masahiro Kamata, Kawasaki (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 329 days.

(21) Appl. No.: 12/471,467

(22) Filed: May 25, 2009

(65) Prior Publication Data

US 2010/0296366 A1 Nov. 25, 2010

(51) Int. Cl.
*H04R 9/00* (2006.01)
*G01V 1/00* (2006.01)

(52) U.S. Cl. .......................................... 367/162; 367/25

(58) Field of Classification Search .................. 367/178, 367/182, 185
See application file for complete search history.

(56) References Cited

U.S. PATENT DOCUMENTS

| | | | |
|---|---|---|---|
| 3,559,050 A | 1/1971 | Mifsud | |
| 4,051,718 A | 10/1977 | Meckl et al. | |
| 4,392,213 A | 7/1983 | Kung et al. | |
| 4,757,706 A | 7/1988 | Doggett | |
| 5,625,348 A * | 4/1997 | Farnsworth et al. | 340/690 |
| 6,353,577 B1 * | 3/2002 | Orban et al. | 367/43 |
| 6,412,592 B1 | 7/2002 | Meynier | |
| 7,099,235 B2 | 8/2006 | Kamata | |
| 7,225,662 B2 | 6/2007 | Kamata | |
| 7,292,504 B2 * | 11/2007 | Luc | 367/185 |
| 7,406,002 B2 * | 7/2008 | Schleisiek et al. | 367/182 |
| 2003/0179103 A1 * | 9/2003 | Kamata | 340/870.16 |
| 2005/0068851 A1 | 3/2005 | Schleisiek et al. | |
| 2005/0201206 A1 | 9/2005 | Luc | |
| 2006/0042352 A1 * | 3/2006 | Kamata | 73/1.85 |

FOREIGN PATENT DOCUMENTS

| | | |
|---|---|---|
| EP | 0203227 | 12/1986 |
| GB | 2203558 | 10/1988 |
| JP | P3098045 | 4/1991 |
| WO | 2006/076925 | 7/2006 |

OTHER PUBLICATIONS

Laine, J.; Mougenot, D.;, "Benefits of MEMS Based Seismic Accelerometers for Oil Exploration," Solid-State Sensors, Actuators and Microsystems Conference, 2007. Transducers 2007. International , vol., No., pp. 1473-1477, Jun. 10-14, 2007.*
Brincker, R., Lago, T., Andersen, P., and Ventura, C."Improving the classical geophone sensor element by digital correction." Tech. rep., Pinocchio Data Systems, Feb. 2005.*
"SM-45 Miniature High Temperature Geophone"—Specification Brochure. Input/Output, Inc., http://www.geophone.com . Feb. 2006.*

* cited by examiner

*Primary Examiner* — Thomas Tarcza
*Assistant Examiner* — James Hulka
(74) *Attorney, Agent, or Firm* — Jianguang Du; Jody DeStefanis; Jeff Griffin

(57) ABSTRACT

Methods and systems utilizing seismic sensors configured or designed for use in seismic signal detection. An electrical current is applied to a seismic sensor such that the moving coil is located at a neutral position relative to the magnetic field in the seismic sensor to compensate for gravitational acceleration.

25 Claims, 25 Drawing Sheets

METHODS AND SYSTEMS FOR SEISMIC SIGNAL DETECTION

BACKGROUND

The present invention relates to devices for sensing vibrations in earth formations. More specifically, the present disclosure is directed to electrodynamic sensing devices, such as geophones and seismometers, that have a moving coil placed in a magnetic field in a centered position. The present disclosure may be applicable to other types of vibration transducers, either in sensing or transmitting operation.

In the oil and gas industry seismic sensors are deployed at various locations, such as on the earth surface, in the sea, at the seabed, or in a borehole, to provide operationally significant subsurface structural and material information by measuring seismic signals reflected from changes in the subsurface structures. In this, seismic sensors are commonly used for purposes of obtaining useful data relating to acoustic impedance contrasts in subsurface structures.

Seismic sensors are also prevalent in earthquake monitoring, long term monitoring for water and $CO_2$ reservoirs, nuclear test monitoring, and such like activity that require the accurate and efficient acquisition of seismic data.

In seismic signal detection, the vibrations in the earth resulting from a source of seismic energy are sensed at discrete locations by sensors, and the output of the sensors used to determine the structure of the underground formations. The source of seismic energy can be natural, such as earthquakes and other tectonic activity, subsidence, volcanic activity or the like, or man-made such as acoustic signals from surface or underground operations, or from deliberate operation of seismic sources at the surface or underground. For example, the sensed seismic signals may be direct signals that are derived from micro-seismicity induced by fracturing or reservoir collapse or alteration, or reflected signals that are derived from an artificial source of energy.

Sensors fall into two main categories; hydrophones which sense the pressure field resulting from a seismic source, or geophones which sense particle motion arising from a seismic source.

As depicted in FIG. 1A, a typical geophone 10 has one or more cylindrical moving coil 12 that is suspended by springs 20 so as to be disposed around a magnet 15 having pole pieces 16. The geophone 10 has a housing 14 and end caps 18. Each moving coil 12 is maintained at a neutral, rest position by the springs 20, and is free to oscillate in a magnetic field of the magnet 15 from a centered position thereof. Springs 20 are usually made with a sheet metal designed to maintain the coil 12 at a centered, equilibrium position relative to the magnetic field of the magnet 15. In a geophone that is designed for vertical operation, the springs 20 are pre-stressed to centralize the moving coil 12 in the magnetic field against gravitational acceleration.

When the earth moves due to the seismic energy propagating either directly from the source or via an underground reflector, the geophone, which can be located at the earth's surface, in the sea or at the seabed, or on the wall of a borehole which penetrates the earth, moves with the particle motion caused by acoustic wave propagation.

If the axis of the geophone is aligned with the direction of motion, however, the moving coil mounted on the spring inside the geophone stays in the same position causing relative motion of the coil with respect to the housing. When the coil moves in the magnetic field, a voltage is induced in the coil which can be output as a signal.

FIG. 1B is a schematic depiction of a geophone in which $x_0$ is the neutral position of the moving coil, x is the position of the coil in motion and $\xi$ is the relative displacement of the coil against the center of the magnetic field. The spring and mass system creates a natural frequency, $\omega_0 = \sqrt{k/m}$, where k is the spring constant and m is the moving mass of the coil assembly. The movement of the moving coil relative to the magnetic field generates an electric output $$e_g = S_0 \frac{d\xi}{dt}$$

where $S_0$ is the sensitivity and $$\frac{d\xi}{dt}$$

is the velocity of the coil above the natural frequency of the geophone. The generated electric signal flows through the shunt resistor $R_s$ and coil. The current i in the coil damps the movement of the coil. Exemplary amplitude and phase responses of a typical geophone with 10 Hz natural frequency are shown in FIG. 1C for different damping factors D.

In seismicity monitoring, it is desirable to acquire low frequency seismic data. In this, the signal-to-noise ratio (SNR) is improved if seismicity is measured in deep boreholes. However, the environmental temperatures in deep boreholes are often high, and the borehole diameters are small. It is difficult to design low frequency and high temperature geophones having a small size. In addition, geophones for borehole applications should be rugged because of rough handling. Borehole geophones are also expected to work under tilt since a borehole can be deviated. Furthermore, after installation in a deep hole a geophone may be required to continuously monitor seismicity for many years. The geophone is expected to function reliably for a long time at high temperatures.

As previously mentioned, the force due to gravitational acceleration is balanced with the natural displacement of the spring.

$$mg = k\xi_0 \quad \text{Equation 1}$$

where m is the moving mass; k is the spring constant, and $\xi_0$ is the natural displacement. Since $$\omega_0 = \sqrt{k/m}$$

$$\xi_0 = g/\omega_0^2 \quad \text{Equation 2}$$

Equation 2 shows that the natural displacement is inversely proportional to square of the natural frequency and the amount is large for a low natural frequency geophone.

FIG. 2A shows the natural displacement $\xi_0$ of a geophone moving coil due to gravitational acceleration as a function of natural frequency $f_0 = \omega_0/2\pi$. This is the amount of pre-stress that is needed in the springs so as to centralize the coil. As evident from FIG. 2A, a pre-stress of about 2.5 mm is required for a 10 Hz geophone. In this, a large natural displacement is required for low frequency geophones, i.e., geophones having low $f_0$. As discussed in more detail below, it is difficult to obtain low frequency seismic sensors having a small, compact size that is suitable for downhole deployment in a borehole.

Since low frequency signals are desired for some applications, such as inverting seismic signals to acoustic impedance or computing source mechanism from measured seismic signals, the natural frequency of the geophones needs to be reduced. However, the natural displacement is increased when the natural frequency of the geophones is lowered. A geophone is typically 1 inch in outer diameter and 1.2 inch in height. In such a small size, the maximum pre-stress that is possible in the spring is a few millimeters, but not in the order of inches. Even for a large seismometer, having, for example, an outer diameter of 2 inches and a height of 4 inches, it is still difficult to provide pre-stress of a few inches. Thus, it is difficult to design a geophone with a lower natural frequency and having a small size.

Typically, the springs of a geophone are made of beryllium copper for durability. The springs are designed to maintain the moving coil at the center of the magnetic field; however, over time there is creep in the spring. The creep is pronounced especially at high temperatures, as shown in FIG. 2B. It is known that inconel creeps less than beryllium copper, as shown in FIG. 2B. However, inconel is expensive and it is difficult to make an inconel spring.

Since spring creep causes the coil to be displaced from the center over time the geophone response also changes. Eventually, after a period of use, the moving coil may be displaced to the bottom of the geophone housing, and the geophone will not respond to external vibration.

If a geophone is tilted, i.e., is moved away from the orientation that it is designed for, the moving coil is eccentered with respect to the magnetic field in the magnet. Note FIG. 2C. As mentioned above, the springs that support the moving coil are pre-stressed to compensate for gravitational force so that the moving coil is centered in the geophone. However, if such a geophone is tilted, the pre-stressed springs cause the moving coil to move in the upward direction. Therefore, the moving coil is displaced from its neutral position relative to the vertical position of the geophone, as depicted in FIG. 2C. In FIG. 2C, the neutral or rest position of the moving coil of a vertical geophone seismic sensor is designated as $x_0$, and the displaced position due to tilt $\theta$ is designated as x. If the amount of tilt is large, the moving coil may hit an end cap of the geophone so that the geophone is no longer able to respond to seismic vibrations.

When a geophone is tilted from the vertical orientation, the pre-stressed springs move the moving coil in an upward direction by $\xi$ due to less gravitational acceleration, as shown in FIG. 2C. The amount of $\xi$ is:

$$\xi_V = \frac{g}{\omega_0^2}(1-\cos\theta) \quad \text{Equation 3}$$

where g is gravitational acceleration; $\theta$ is tilt measured from vertical; $\omega_0$ is angular natural frequency equal to $2\pi f_0$; k is spring constant; and m is moving mass. The subscript v denotes a vertical geophone having a spring that is pre-stressed to center the moving coil when the geophone is vertical.

Similarly, for a horizontal geophone without a pre-stressed spring, the dislocation of the moving coil is:

$$\xi_H = \frac{g}{\omega_0^2}\sin\theta \quad \text{Equation 4}$$

The natural displacement is large when the natural frequency of the geophone is low, as shown in FIG. 2D, and the shift of natural displacement due to tilt is large. Since the stroke of the moving coil is finite by design, the moving coil may exceed the maximum space for it to move and the geophone will stop responding to vibrations.

When the moving coil is not centered in the magnetic flux field, the open circuit sensitivity, $S_0$ and open circuit damping, $D_0$ are reduced and total harmonic distortion becomes large. In this, if a vertical geophone is tilted from its vertical position the geophone response parameters $S_o$, $D_o$, and $f_o$, change based on the amount of tilt. Changes in geophone response parameters change the waveform of recorded seismic signals, which is not desirable for the analysis of the recorded data.

In summary, in order to measure small seismic signals at low frequency, the natural frequency of a geophone should be low. However, when the natural frequency is lowered the natural displacement of the geophone becomes large, and the size of the geophone increases in order to accommodate the natural displacement of the geophone. When the natural displacement of the moving coil due to gravitational acceleration is large, it is difficult to accommodate the changes in natural displacement for different tilt conditions. Therefore, the range of tilt is very limited and precise setting of the geophone is required during installation. Finally, there is spring creep over time, especially at high temperatures, and such a geophone stops working after being used for a long period of time.

Accordingly, it will be appreciated that there exists a desire to improve upon conventional geophones in order to improve the accuracy of seismic measurements.

The limitations of conventional seismic sensor designs noted in the preceding are not intended to be exhaustive but rather are among many which may reduce the effectiveness of previously known sensor mechanisms. The above should be sufficient, however, to demonstrate that sensor structures existing in the past will admit to worthwhile improvement.

SUMMARY OF THE DISCLOSURE

Embodiments disclosed herein provide methods and systems for seismic sensors, such as geophones and seismometers. In particular, some embodiments of the present disclosure provide methods and systems having seismic sensors that provide the capability to recover low frequency seismic signals with a small size geophone package. The seismic sensors of the present disclosure are omni-tiltable and are not adversely affected by extended deployment in high temperature environments.

The moving coil of the seismic sensors is placed in a centralized position relative to the magnetic field inside the seismic sensor by applying an electrical current to counter gravitational force. Since the natural displacement due to gravity of the moving coil is compensated by electrical current instead of a pre-stressed spring the seismic sensors of the present disclosure are adapted for use in the acquisition of low frequency seismic signals and in different operational orientations and environments. The seismic sensors have a single coil feedback system and signals that include a combination of displacement signals and velocity signals so that it is possible to obtain a wide frequency response. Furthermore, a test circuit is integrated in the system to provide response calibration and tuning of the feedback parameters and parameters for signal combination. Additionally, the systems and methods disclosed herein provide continuous temperature monitoring and updating of electric levitation current and feedback parameters and signal combination parameters while acquiring seismic data.

The applicant recognized that using electrical current to raise the moving coil against gravitational force, instead of a conventional pre-stressed spring, would eliminate gravitational force on the spring. Since the electric levitation removes stress from the spring creep at high temperatures is prevented.

The applicant further recognized that electric levitation causes DC shift to seismic signals. At very low frequency signals of interest a simple DC block filter causes phase shift to the low frequency signals. The applicant has proposed herein various ways to cancel DC offset in the seismic signals.

Applicant further recognized that it is possible to lower the natural frequency of a geophone by using positive displacement feedback. Additionally, applicant realized that by combining displacement and velocity signals it is possible to obtain a wide frequency response. Also, applicant realized that it is possible to use calibration to determine feedback parameters and to equalize the geophone response by adding the integral of displacement, i.e., an open loop control. Applicant also recognized that it is possible to continuously update feedback parameters, signal combinations, or equalizer parameters by monitoring the temperature of the geophone without interrupting seismic data acquisition.

In one embodiment of the present disclosure, a system for use in seismic signal detection comprises at least one electrically levitated seismic sensor. The electrically levitated seismic sensor comprising a housing; at least one magnet for creating a magnetic field mounted within the housing; and a moving coil within the housing structured and arranged so as to be fixed in a radial direction relative to the housing and movable in an axial direction thereof. An electrical circuit is configured or designed for providing an electrical signal to the seismic sensor. A digital signal processor is in communication with the seismic sensor and a set of instructions executable by the processor that, when executed, applies the electrical signal to the seismic sensor such that the moving coil is levitated against gravitational force so as to be located at a central position relative to the magnetic field in the seismic sensor.

In certain aspects, the electrical circuit may comprise a shunt resistor to adjust movement of the moving coil of the seismic sensor and/or the electrical circuit may be configured or designed to adjust movement of the moving coil by velocity feedback. In other aspects, the electrical circuit may be configured or designed to provide integrated feedback to the seismic sensor. The digital signal processor may be configured or designed to monitor electrical signals output from the seismic sensor to derive temperature of the seismic sensor and to compensate sensor parameters for temperature dependency during acquisition of seismic data by the seismic sensor. In one possible embodiment, the electrical circuit is further configured or designed to supply a constant current to the moving coil of the seismic sensor. In certain aspects of the present disclosure, the levitation force is constant.

The seismic sensor may be configured or designed for downhole use in a borehole; for permanent or semi-permanent installation in seismic signal detection; or for long term deployment in high-temperature environments in excess of about 125 degrees Celsius. In yet other aspects herein, the seismic sensor may be configured or designed for low frequency seismic signal detection downhole in a borehole. In one possible embodiment, the seismic sensor is omni-tiltable without gimbaling.

In aspects of the present disclosure, the electrical circuit may be configured or designed for measuring position of the moving coil during levitation. The system may be configured or designed for real-time adjustment of a levitation voltage to maintain location of the moving coil based on the measured position of the moving coil. The seismic sensor may comprises a position sensor within the housing configured or designed to sense position of the moving coil. The electrical circuit may be configured or designed to compensate for one or more of DC offset and noise due to a levitation current. In yet other embodiments herein, the electrical circuit may be configured or designed to provide a positive displacement feedback signal to an output of the seismic sensor such that the natural frequency of the seismic sensor is reduced. In yet other embodiments, the system may be configured or designed to provide an output signal comprising a combination of velocity and displacement signals output from the seismic sensor.

In certain embodiments of the present disclosure, the electrical circuit may be configured or designed to output velocity signals in a wide frequency range. The system may be configured or designed to calibrate the seismic sensor for temperature variations.

A system for use in seismic signal detection is provided comprising at least one seismic sensor comprising a housing; at least one magnet for creating a magnetic field mounted within the housing; and a moving coil within the housing structured and arranged so as to be fixed in a radial direction relative to the housing and movable in an axial direction thereof. The system includes an electrical circuit configured or designed for providing an electrical signal to the seismic sensor; a digital signal processor in communication with the seismic sensor; a set of instructions executable by the processor that, when executed, applies the electrical signal to the seismic sensor, wherein the system is configured or designed to continuously monitor coil DC resistance (DC resistance) of the moving coil of the seismic sensor while detecting seismic signals to derive seismic sensor temperature, and to compensate sensor parameters based on variations in seismic sensor temperature. In aspects herein, the system may be configured or designed to compensate sensor parameters for temperature variations during seismic signal detection. The digital signal processor may be configured or designed to process signal data in real-time.

In certain embodiments of the present disclosure, a method of seismic signal detection using at least one electrically levitated seismic sensor comprises deploying at least one electrically levitated seismic sensor at a location for seismic signal detection; providing an electrical levitation signal to the seismic sensor to levitate the moving coil against gravitational force so that the moving coil is located at a central position relative to the magnetic field in the seismic sensor; detecting seismic signals with the at least one electrically levitated seismic sensor; and outputting velocity and displacement signals from the seismic sensor based on the sensed seismic signals.

A seismic sensor for use in seismic signal detection downhole in a borehole is provided comprising a housing; at least one magnet for creating a magnetic field mounted within the housing; a moving coil within the housing structured and arranged so as to be fixed in a radial direction relative to the housing and movable in an axial direction thereof; and an electrical circuit configured or designed for providing an electrical signal to the moving coil to levitate the moving coil against gravitational force so that the moving coil is located at a central position relative to the magnetic field in the seismic sensor. In certain aspects, the natural frequency ($f_o$) of the moving coil of the seismic sensor may be from about 0.5 Hz to about 5 Hz and outer diameter (OD) and height (H) of the seismic sensor housing may be less than about 1.5 inches.

In other embodiments herein, a system for use in seismic signal detection comprises at least one seismic sensor having a housing; at least one magnet for creating a magnetic field mounted within the housing; and a moving coil within the housing structured and arranged so as to be fixed in a radial direction relative to the housing and movable in an axial direction thereof. In certain embodiments, the system includes at least two sensing elements configured or designed to generate a first signal based on velocity measurements and a second signal based on displacement measurements of the seismic sensor, respectively. The system is configured or designed to combine the first signal and the second signal to generate a combined output signal.

In yet another possible embodiment, a method for seismic signal detection comprises deploying at least one seismic sensor; sensing seismic signals with the seismic sensor; generating a first signal based on velocity measurements and a second signal based on displacement measurements of the seismic sensor; and combining the first signal and the second signal to generate a combined output signal.

Additional advantages and novel features will be set forth in the description which follows or may be learned by those skilled in the art through reading the materials herein or practicing the principles described herein. Some of the advantages described herein may be achieved through the means recited in the attached claims.

THE DRAWINGS

The accompanying drawings illustrate certain embodiments and are a part of the specification. Together with the following description, the drawings demonstrate and explain some of the principles of the present invention.

Figure 1A:
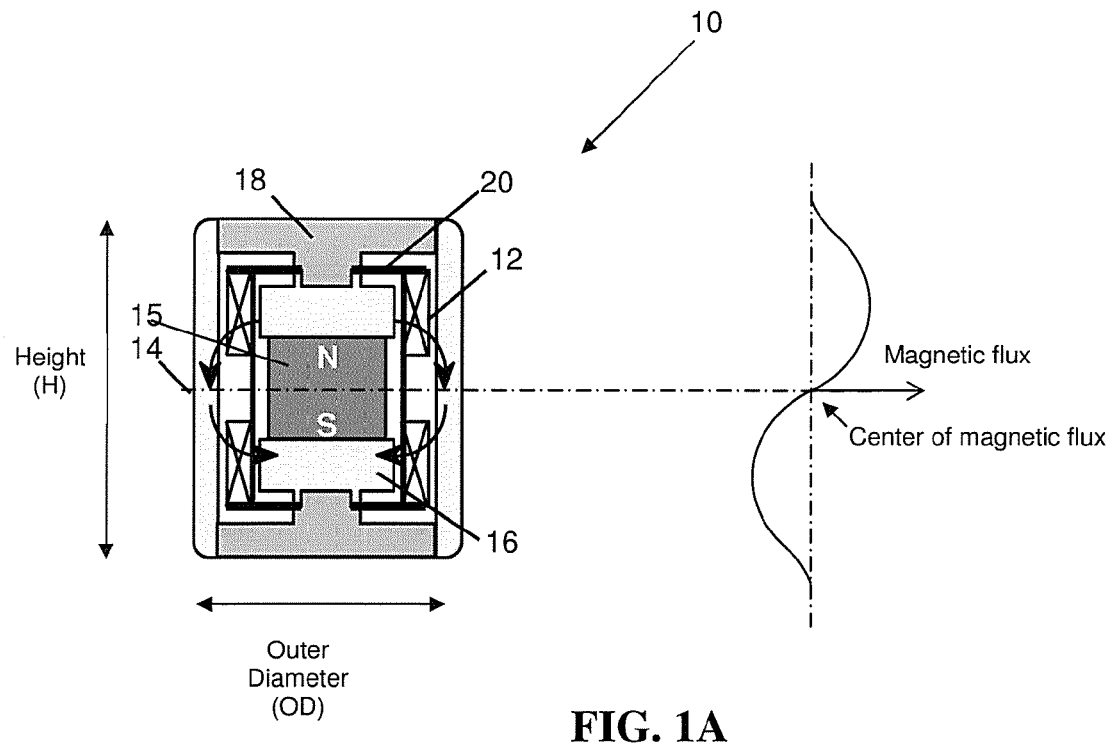
FIG. 1A is a schematic view of a conventional geophone seismic sensor.

Throughout the drawings, identical reference numbers and descriptions indicate similar, but not necessarily identical elements. While the principles described herein are susceptible to various modifications and alternative forms, specific embodiments have been shown by way of example in the drawings and will be described in detail herein. However, it should be understood that the invention is not intended to be limited to the particular forms disclosed. Rather, the invention includes all modifications, equivalents and alternatives falling within the scope of the appended claims.

DETAILED DESCRIPTION

Illustrative embodiments and aspects of the invention are described below. It will of course be appreciated that in the development of any such actual embodiment, numerous implementation-specific decisions must be made to achieve the developers' specific goals, such as compliance with system-related and business-related constraints, that will vary from one implementation to another. Moreover, it will be appreciated that such development effort might be complex and time-consuming, but would nevertheless be a routine undertaking for those of ordinary skill in the art having the benefit of this disclosure.

Reference throughout the specification to "one embodiment," "an embodiment," "some embodiments," "one aspect," "an aspect," or "some aspects" means that a particular feature, structure, method, or characteristic described in connection with the embodiment or aspect is included in at least one embodiment of the present invention. Thus, the appearance of the phrases "in one embodiment" or "in an embodiment" or "in some embodiments" in various places throughout the specification are not necessarily all referring to the same embodiment. Furthermore, the particular features, structures, methods, or characteristics may be combined in any suitable manner in one or more embodiments. The words "including" and "having" shall have the same meaning as the word "comprising."

Moreover, inventive aspects lie in less than all features of a single disclosed embodiment. Thus, the claims following the Detailed Description are hereby expressly incorporated into this Detailed Description, with each claim standing on its own as a separate embodiment of this invention.

Turning now to the drawings, wherein like numerals indicate like parts, the disclosure herein is directed to the concept of various techniques that may be utilized to facilitate and improve seismic signal detection. The present disclosure contemplates applicability of the disclosed techniques to electrodynamic type sensors, such as a geophone or a seismometer, that are utilized in the field of seismic prospecting, or of active or passive monitoring of underground reservoirs. The sensors may be deployed in exploration and/or production wells that are deviated in relation to the vertical direction, and comprise multi-component geophones for detecting components of signals that are received along three orthogonal axes. In aspects according to the present disclosure, the seismic sensors may be utilized in wireline systems, land seismic surveying systems, seabed seismic surveying systems, permanent or other monitoring systems, including systems for monitoring earthquakes or micro-seismicity in a reservoir. Some principles of the present disclosure are also described in co-pending, commonly owned, U.S. patent application Ser. No. 11/733,214, titled "Geophone Calibration Technique", the entire contents of which are hereby incorporated herein by reference.

As described in greater detail below, the present disclosure provides various techniques which may be used to facilitate and improve seismic signal detection. The present disclosure contemplates application of the principles herein to various areas, such as wireline, land seismic, seabed seismic, permanent or other monitoring, hydro-fracture monitoring, production logging, among others.

Figure 1B:
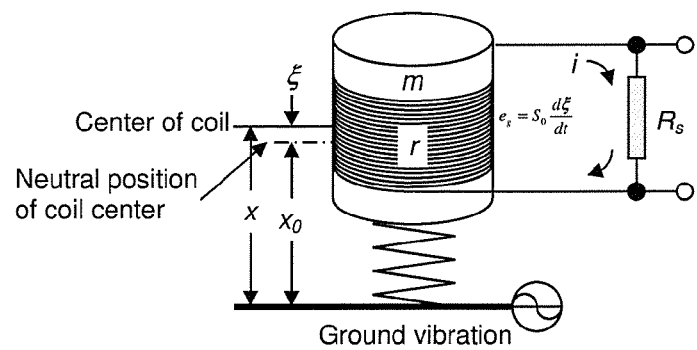
FIG. 1B is a schematic depiction of a geophone seismic sensor to explain principles discussed herein.
Figure 1C:
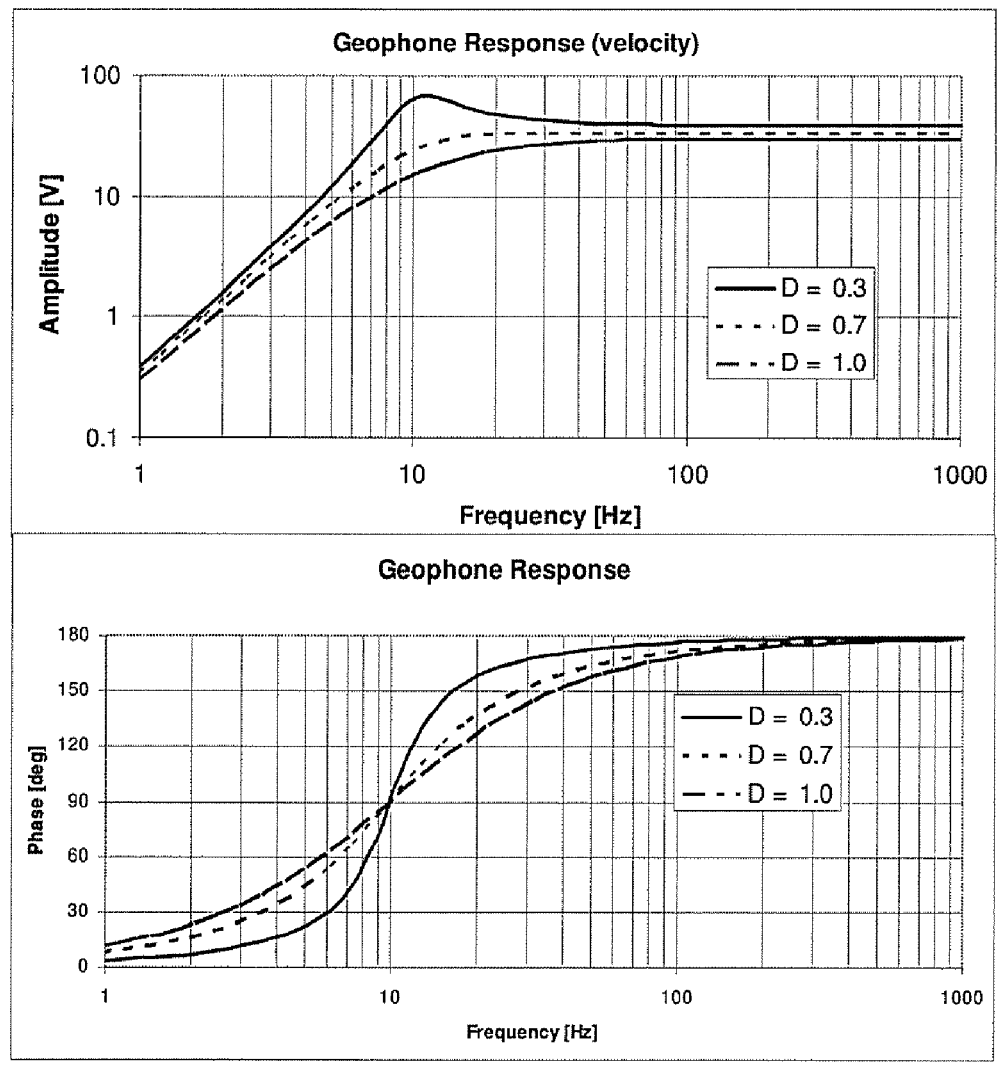
FIG. 1C depicts in graphs the amplitude and phase responses of a 10 Hz conventional geophone for different damping factors D.

In order to gain a better understanding of the various techniques and features described in this application, a brief description of geophone measurement techniques will now be provided. A seismic survey measures seismic waves propagated through the earth to map structural images in the earth. Geophones are often used to detect seismic signals at various locations, such as, for example, downhole, at ground surface and/or at the seabed. An example of a conventional geophone is shown in FIG. 1A. FIG. 1B is a schematic depiction of a geophone to explain principles discussed herein and FIG. 1C depicts in graphs the amplitude and phase responses of a 10 Hz conventional geophone for different damping factors D.

The geophone 10 of FIG. 1A includes a moving coil 12 mounted on a bobbin, a magnet 15, a pair of pole pieces 16 with suspension springs 20 and a housing 14. The pole pieces 16 and housing 14 are made of magnetically permeable material and form a magnetic field in which the moving coil 12 is suspended. In the example of FIG. 1A, the moving coil 12 mounted on a bobbin and suspension springs 20 collectively form the effective moving mass portion m of the geophone.

In a conventional geophone, the moving coil is suspended in a magnetic field by means of a pair of springs, as shown in FIG. 1A. The springs are designed to control radial movement of the coil and to provide a desired natural frequency for the mass-spring system.

Applicant recognized that conventional seismic sensors have limitations that may be addressed by the electrically levitated seismic sensors of the present disclosure. Specifically, low frequency signal recovery necessitates that the natural frequency of the sensor, $f_0$, be lowered, which causes the natural displacement of the moving coil to be increased and, therefore, the size of the sensor. It is, therefore, difficult to package a seismic sensor having low $f_0$ in a small package.

In addition, an omni-tiltable seismic sensor is desirable especially in borehole deployment. Typically, a gimbal system or a motor driven platform is used; however, the gimbal or drive motor mechanism tends to increase the size of the seismic sensor.

Seismic sensors of the type described herein are used in, for example, high-temperature wells where the high temperature may cause spring creep. As a result, the geophone response changes and eventually the sensor stops working.

In contrast with the typical seismic sensor system that requires a pre-stressed spring in the seismic sensor to support the moving coil in a neutral position against gravitational force, the present disclosure teaches that the position of the coil is centered in the magnetic field by means of electric levitation. As used herein, the term "electrical levitation" refers to the use of an electrical signal to raise or levitate the moving coil of a seismic sensor against gravitational force. As previously discussed, conventional seismic sensors of the type described herein have pre-stressed springs to raise the moving coil against gravitational force so that the moving coil is centered in the magnetic field inside the seismic sensor. The present disclosure contemplates that electrical levitation replaces the conventional pre-stressed spring. In this, the spring mechanism of the present sensors is designed to retain or fix the moving coil against radial movement relative to the housing of the sensor while allowing free axial movement thereof. Although the above description proposes that electrical levitation replaces pre-stressed springs of conventional seismic sensors it is not necessary to eliminate pre-stress in the spring mechanism. It is contemplated that pre-stress in the spring mechanism will be minimized, if not entirely eliminated, so that the spring does not introduce errors in the location of the moving coil.

As used in this application, the term "geophone" is intended to include conventional-type geophones such as that illustrated in FIG. 1A, and very low frequency geophones such as seismometer type electrodynamic sensors, as well as geophone accelerometer (GAC) devices from Schlumberger Corporation which, for example, may be configured or designed to measure relatively wider acceleration ranges than conventional-type geophones. As shown in FIG. 1A, a typical geophone 10 includes a moving coil that is suspended in a magnetic flux by means of a spring or a pair of springs. The moving coil tries to stay in the same position while the housing of the geophone is moved in response to external vibrations.

Figure 1D:
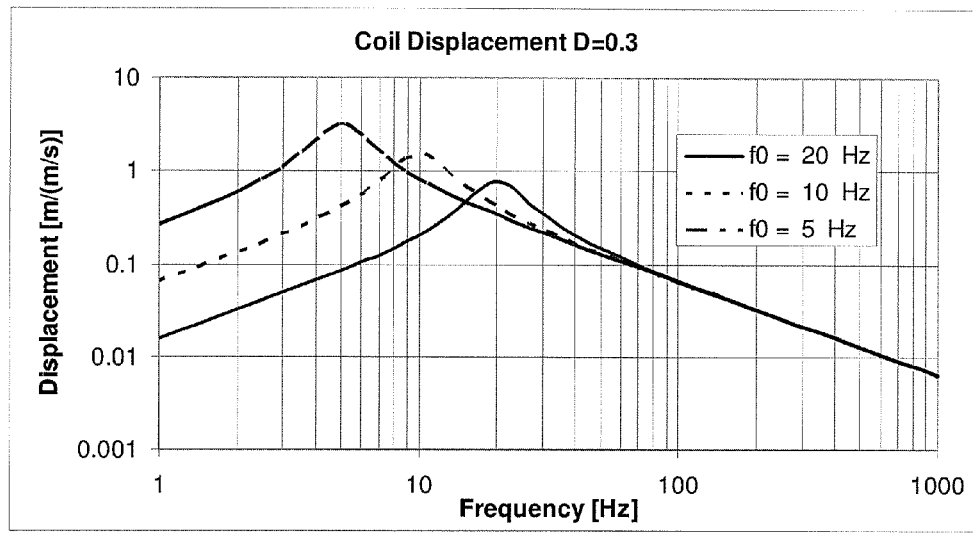
FIG. 1D is a graphical depiction of moving coil displacement response for seismic sensors having different natural frequencies $f_o$.
Figure 1E:
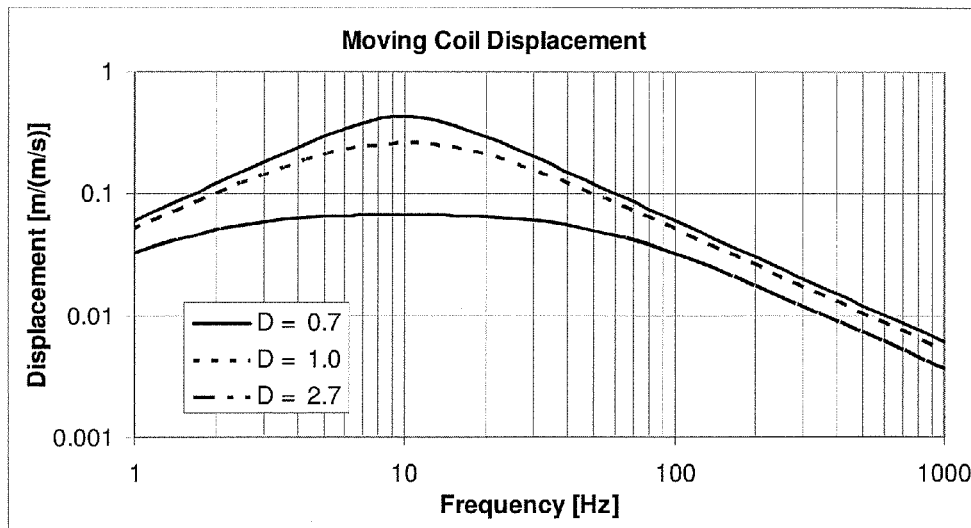
FIG. 1E is a graphical depiction of moving coil displacement response for seismic sensors having different damping factors D.

FIG. 1B is a schematic depiction of a geophone seismic sensor and FIG. 1C depicts the amplitude and phase responses of a 10 Hz conventional geophone for different damping factors, D, that are obtained by adjusting the shunt resistor, $R_s$. In FIG. 1D, moving coil displacement response for seismic sensors having different natural frequencies $f_o$ are shown. The displacement of the moving coil is large for low natural frequencies, and a suitably large moving space is required for the moving coil. In FIG. 1E, moving coil displacement response for seismic sensors having different damping factors D are shown. In this, it is possible to reduce the moving space for the moving coil by increasing the damping factor.

A geophone converts the ground motion to electric signals. As previously discussed above, in a typical geophone a moving coil is suspended in a magnetic flux field by means of a pair of springs, as shown in FIG. 1A. When the geophone housing moves with ground motion, the moving coil stays at the same position. The motion of the moving coil relative to the housing (with a magnetic flux field) causes the coil to generate electric signals that are proportional to the velocity of the moving coil.

Referring again to FIG. 1B, the geophone moving coil has a mass m, and its neutral position relative to the housing is $x_0$. The position of the moving coil relative to the neutral position is $\xi$. The DC resistance of the coil is r and the output of the moving coil is connected to an external resistance $R_s$ to adjust the damping factor D. As the moving coil of the geophone moves in the magnetic flux, the coil generates signal $e_g$:

$$e_g = Blv \qquad \text{Equation 5}$$

where B is the magnetic flux density, l is the length of the coil, and v is the velocity of the coil relative to the magnetic field. The product Bl is the conversion factor of a geophone from velocity of ground motion to the electric signal $e_g$ and is usually treated as the sensitivity, $S_0$.

The current flows out of the moving coil and is returned through the shunt resistor $R_s$:

$$i = \frac{e_g}{r + R_s} \qquad \text{Equation 6}$$

The current in the coil causes a force f to prevent the motion of the coil, i.e., a damping force:

$$f = S_0 i \qquad \text{Equation 7}$$

The equation of motion for the moving coil is written as:

$$m\frac{d^2\xi}{dt^2} + \mu\frac{d\xi}{dt} + k\xi = -m\frac{d^2u}{dt^2} - S_0 i \qquad \text{Equation 8}$$

where u is the displacement of the ground motion, μ is the friction coefficient, and k is the spring constant. The natural frequency $\omega_0$ and the open circuit damping factor $D_0$ are defined as:

$$\omega_0 = \sqrt{\frac{k}{m}} \qquad \text{Equation 9}$$

$$D_0 = \frac{\mu}{2m\omega_0} \qquad \text{Equation 10}$$

The total damping D is defined as:

$$D = D_0 + \frac{S_0^2}{2m\omega_0(r + R_s)} \qquad \text{Equation 11}$$

The equation of motion for the moving mass is rewritten as:

$$\frac{d^2\xi}{dt^2} + 2\omega_0 D\frac{d\xi}{dt} + \omega_0^2\xi = -\frac{d^2u}{dt^2} \qquad \text{Equation 12}$$

Assuming that the ground motion is given by:

$$u = \alpha\sin(\omega t) \qquad \text{Equation 13}$$

The solution for Equation 12 is then written as:

$$\xi = a\left(\frac{\omega}{\omega_0}\right)^2 \frac{\left(1 - \frac{\omega^2}{\omega_0^2}\right)\sin(\omega t) - \left(2D\frac{\omega}{\omega_0}\right)\cos(\omega t)}{\left\{\left(1 - \frac{\omega^2}{\omega_0^2}\right)^2 + \left(2D\frac{\omega}{\omega_0}\right)^2\right\}} \qquad \text{Equation 14}$$

The sine and cosine terms may be combined with a phase delay as:

$$\xi = \frac{a\left(\frac{\omega}{\omega_0}\right)^2}{\sqrt{\left(1 - \frac{\omega^2}{\omega_0^2}\right)^2 + \left(2D\frac{\omega}{\omega_0}\right)^2}} \sin(\omega t - \varphi) \qquad \text{Equation 15}$$

$$\tan(\varphi) = \frac{2D\frac{\omega}{\omega_0}}{1 - \frac{\omega^2}{\omega_0^2}} \qquad \text{Equation 16}$$

Then the electric signals are:

$$e_g = \frac{a\omega S_0\left(\frac{\omega}{\omega_0}\right)^2}{\left(1 - \frac{\omega^2}{\omega_0^2}\right)^2 + \left(2D\frac{\omega}{\omega_0}\right)^2} \cos(\omega t - \varphi) \qquad \text{Equation 17}$$

The output signal is reduced by the shunt resistance and coil resistance and the output of the sensor through the shunt resistor R is reduced by $R_s/(r+R_s)$.

FIG. 1C depicts in graphs the amplitude and phase responses of a 10 Hz conventional geophone for different damping factors D. Assuming that a geophone has response parameters as shown in Table 1 below:

TABLE 1

| | Geophone |
|---|---|
| f0 [Hz] | 10 |
| S0 [V/(m/s)] | 40 |
| D0 [—] | 0.2 |
| r [ohm] | 400 |
| m [kg] | 0.01 | the total damping factor D was adjusted by appropriate shunt resistors $R_s$, to create D=0.3, D=0.7 and D=1.0 by using Equation 11, as shown in Table 2 below.

TABLE 2

|  | Case 1 | Case 2 | Case 3 |
| --- | --- | --- | --- |
| Rs [ohm] | 12286 | 2145 | 1192 |
| D [—] | 0.30 | 0.70 | 1.00 |
| S [V/(m/s)] | 38.7 | 33.7 | 29.9 |

The normalized amplitude response $e_g/(\alpha\omega)$ for a unit velocity input is plotted in FIG. 1C using Equation 17 for D=0.3, 0.7 and 1.0. The phase response derived by Equation 16 is also shown in FIG. 1C. As evident from FIG. 1C, the motion of the moving coil is opposite to the ground motion at frequencies above the natural frequency.

From Equation 15, the displacement of the moving coil for constant velocity is written as:

$$\frac{\xi}{a\omega} = \frac{\frac{1}{\omega}\left(\frac{\omega}{\omega_0}\right)^2}{\sqrt{\left\{1-\left(\frac{\omega}{\omega_0}\right)^2\right\}^2 + \left(2D\frac{\omega}{\omega_0}\right)^2}} \sin(\omega t - \varphi) \quad \text{Equation 18}$$

Using Equation 18 synthetic data were generated for different natural frequencies based on the parameters shown in Table 3 below, and the results are depicted in FIG. 1D.

TABLE 3

|  | Geophone 1 | Geophone 2 | Geophone 3 |
| --- | --- | --- | --- |
| f0 [Hz] | 20 | 10 | 5 |
| S0 [V/(m/s)] | 40 | 40 | 40 |
| D0 [—] | 0.2 | 0.2 | 0.2 |
| r [ohm] | 400 | 400 | 400 |
| m [kg] | 0.01 | 0.01 | 0.01 |

The moving coil displacements in open circuit condition are shown in FIG. 1D for different natural frequencies. It is noted that the moving coil displacement response increases as the natural frequency is lowered.

The amount of the displacement at a natural frequency is:

$$\xi = \frac{v}{2D\omega_0} \quad \text{Equation 19}$$

Using the parameters of Geophone 2 in Table 3 and Equation 19 the displacements of the moving coil were calculated using total damping D=0.7, 1.0 and 2.75 by adjusting the shunt resistance $R_s$, as tabulated in Table 4 below.

TABLE 4

|  | Case 1 | Case 2 | Case 3 |
| --- | --- | --- | --- |
| Rs [ohm] | 2147 | 1190 | 100 |
| D [—] | 0.70 | 1.00 | 2.75 |
| S [V/(m/s)] | 38.1 | 32.8 | 23.0 |

The resulting moving coil displacements are plotted as functions of frequency in FIG. 1E. It is noted that the displacement becomes maximum at a natural frequency when the total damping factor is small. If the total damping is high, the displacement is constant for a wide frequency range for constant velocity input.

Figure 2A:
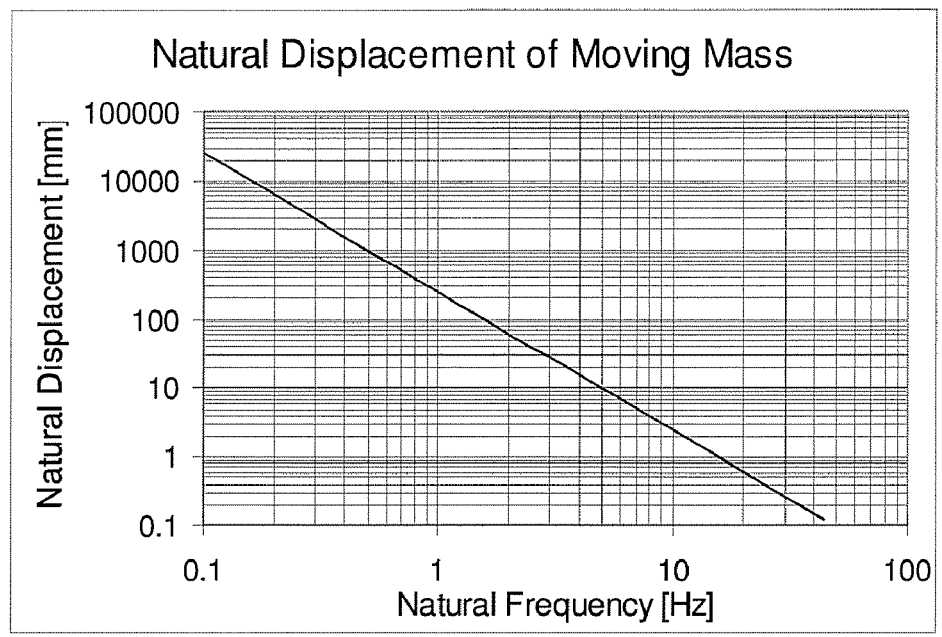
FIG. 2A is a graph depicting the natural displacement of a moving coil in a geophone seismic sensor due to gravitational acceleration.

FIG. 2A is a graph depicting the natural displacement of a geophone due to gravitational acceleration. For a 10 Hz geophone, the natural displacement of the moving coil is about 2.5 mm. In a vertical geophone, the spring to suspend the moving coil is pre-stressed so that the moving coil is in the center of the geophone when it is positioned vertical. A typical size of a 10 Hz geophone would be 1 inch in OD and 1.2 inches in height. A pre-stressed spring having a natural displacement of 2.5 mm is packaged in that size geophone. If the natural frequency is reduced to 1 Hz to detect low frequency signals, the natural displacement may be about 250 mm. A pre-stressed spring with natural displacement of 250 nm would require a housing having a size that is more than 250 mm.

Figure 2B:
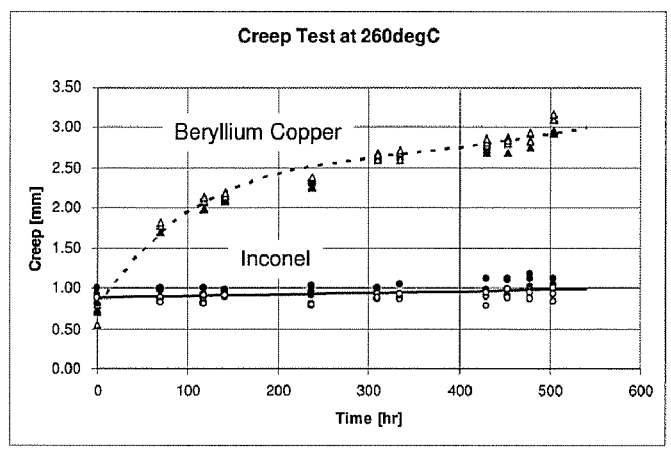
FIG. 2B is a graph depicting creep in geophone springs of different materials at 260 degrees Celsius.
Figure 2D:
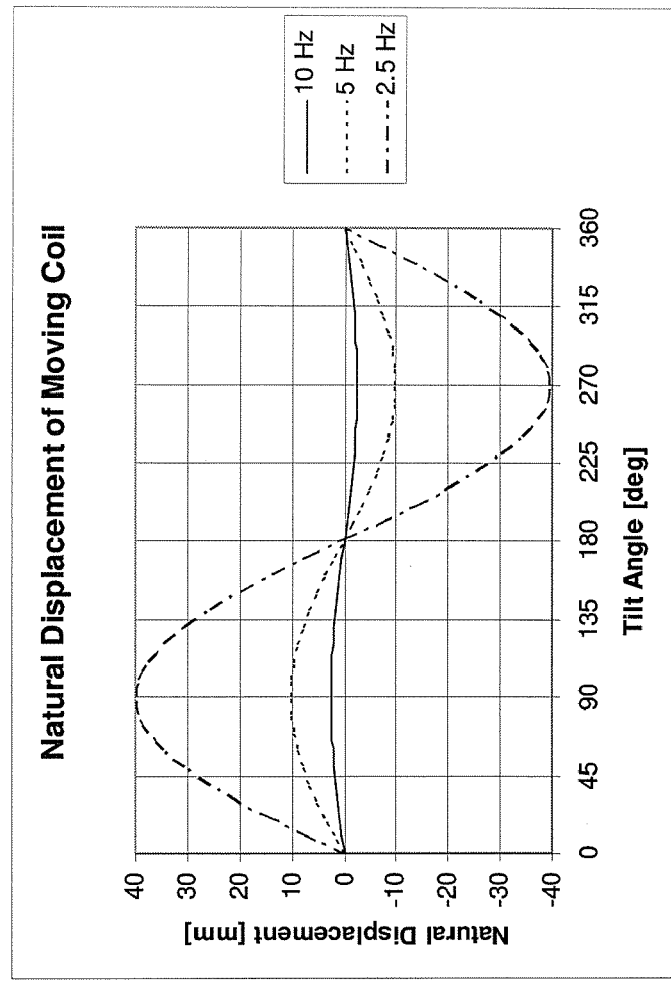
FIG. 2D is a graph depicting the natural displacement of a moving coil for a horizontal geophone without a pre-stressed spring in relation to tilt angle.
Figure 2C:
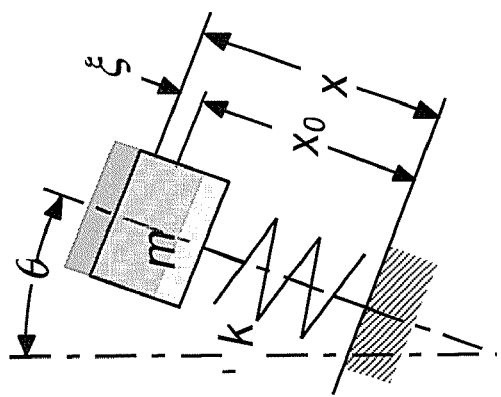
FIG. 2C illustrates schematically the displacement of the center of a moving coil of a vertical geophone seismic sensor from its neutral or rest position $x_0$ to a displaced position x due to tilt θ.

FIG. 2B is a graph depicting creep in geophone springs of different materials at 260 degrees Celsius. If the sensor spring is exposed to high temperatures for a long time, the stress due to the mass and gravitational acceleration causes the spring to creep and permanently deforms the spring. In this, the moving coil is in the center of the seismic sensor housing at the beginning, but the coil is lowered by the amount of spring creep and eventually touches the bottom of the housing and stops working.

As previously discussed above, the present disclosure proposes systems that overcome shortcomings in conventional geophones of the type described above. The present disclosure teaches to feedback the DC component of the moving coil position, but not the motional component. Typically, in servo accelerometers the moving coil displacement signals including the motional component are used for feedback purposes. However, the present applicant recognized that if motional component feedback is applied the feedback is a so called force balance feedback and the output of the seismic sensor becomes proportional to the acceleration rather than the velocity of the moving coil. Such a condition is inherently noisy.

As described in further detail below, current is injected in the moving coil. The current may be applied to the coil via a shunt resistor connected in series to control the damping factor. Since the DC resistance of the coil changes with temperature, if the ambient temperature is high the DC resistance increases and the current in the coil is reduced so that the levitation balance is lost. Therefore, the present disclosure proposes that current for levitating the moving coil may be supplied as a constant current so that the current remains the same even if the temperature changes.

As discussed in further detail below, a position sensor may be provided to monitor the position of the moving coil relative to the magnetic field. As one possible technique, the amount of current necessary to centralize the coil is initially determined by the amount of the moving mass. Since the coil position is monitored by use of a position sensor it is possible to feedback the error in coil position to the coil. Alternatively, it is also possible to levitate the moving coil till the position sensor detects that the coil is in the neutral position.

Feedback of the position information may also be applied to the coil so that the natural frequency can be modified. If positive feedback is applied, the feedback reduces the natural frequency. The moving coil position information may be directly obtained from the position sensor or may be derived by the integral of velocity signals from the moving coil. It is not possible to feedback DC component by the feedback of integrated velocity; however, it is possible to lower the natural frequency.

The present disclosure proposes that the output signals from the coil are amplified and feedback is applied to the coil with reversed polarity. The output from the coil is proportional to the velocity of the coil and the velocity feedback adjusts the damping factor. If the damping factor is large, then the output from the coil is in proportion to the acceleration around the natural frequency. The acceleration linear frequency range is wide with a large damping factor. In this condition, the displacement sensor outputs signals proportional to the velocity. Without over damping, the displacement response of the coil is large at around the natural frequency and total harmonic distortion is large, and a large space is required for the coil to respond to seismic signals (note again FIG. 1E).

The amplifier after the feedback combines signals from the coil and signals from the displacement sensor to extend the frequency range (note FIG. 10 discussed below). The integrated displacement signal may be added to further expand the frequency range (note again FIG. 10).

An initial calibration can be performed by injecting electric signals to the moving coil. The response of the geophone element is measured without any feedback signals. By analyzing the response, the geophone parameters, such as natural frequency, $f_0$, open circuit damping, $D_0$, open circuit sensitivity, $S_0$ and coil resistance, r, are found. Based on the measured response parameters, the feedback constants, and weightings for signal combinations are determined.

In aspects of the present disclosure, the temperature of the sensor element is monitored. An independent temperature sensor may be attached to the housing of the seismic sensor. DC resistance of the moving coil may be measured to estimate the temperature of the seismic sensor. Commonly owned U.S. Pat. No. 7,225,662 discloses techniques for calibrating geophones, the entire contents of which are hereby incorporated herein by reference. The resistance of the coil is a function of temperature and the temperature is estimated by monitoring the resistance. It is also possible to use the electric levitation voltage and current to monitor the DC resistance of the coil. The sensor response parameters change with temperature. The feedback and signal combination constants are modified according to the measured temperature.

The feedback and signal combinations may also be performed by digitized displacement and velocity signals so that the parameters can easily be adjusted according to the calibrated sensor parameters.

Figure 3B:
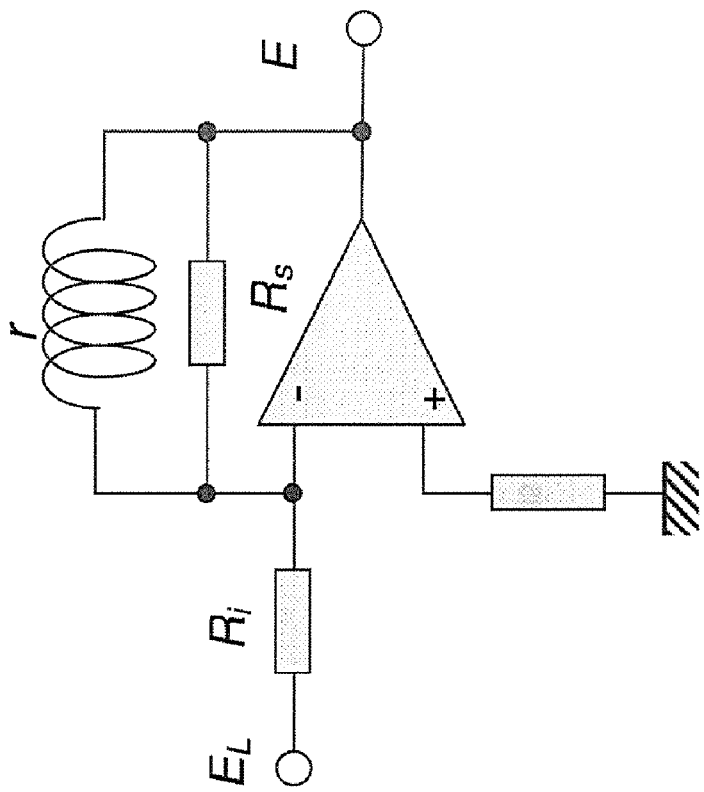
FIGS. 3A and 3B are circuit diagrams for some possible techniques for current injection to levitate a seismic sensor moving coil according to the present disclosure.
Figure 3A:
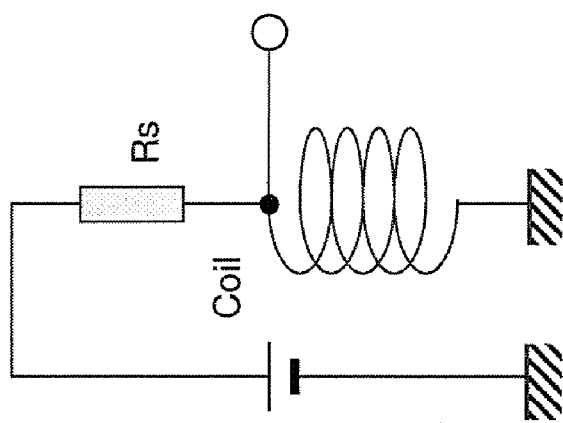

FIGS. 3A and 3B are circuit diagrams depicting some possible techniques for injecting current to levitate the moving coil of seismic sensors according to the present disclosure. The present disclosure teaches that a current is applied to the moving coil of a seismic sensor to balance the gravitational force, as represented by the circuit diagram of FIG. 3A. In this, the electrical levitation replaces or compensates for a pre-stressed spring that is commonly used in prior art seismic sensors. The spring element of the present seismic sensors serves the function of rigidly supporting the moving mass in the radial direction and flexibly supporting it in the axial direction relative to the sensor housing.

Use of electrical levitation instead of a pre-stressed spring provides a low frequency seismic sensor and obviates spring creep. Since the moving mass is suspended or levitated by electric levitation, the large natural displacement of the pre-stressed spring for low frequency geophones or seismometers, as depicted in FIG. 2A, is no longer required. Since a pre-stressed spring no longer supports the moving mass against gravitational force, there is no stress acting on the spring to cause creep at high temperatures. In some aspects disclosed herein, the current flows into the moving coil through a shunt resistor $R_s$, (note FIG. 3A). The shunt resistor $R_s$ is determined according to the damping factor that is desired for specific applications of the seismic sensors.

The gravitational force acting to the moving mass is:

$$f_g = mg \cos(\theta) \qquad \text{Equation 20}$$

where m is the moving mass, g is the gravitational acceleration, and $\theta$ is the tilt angle measured from vertical. The force due to the applied current is:

$$f_i = S_0 i \qquad \text{Equation 21}$$

where $S_0$ is the open circuit sensitivity that is the same as Bl (where B is the magnetic flux density and l is the length of the coil). Since the gravitational force and force due to current balance each other, the amount of current needed is:

$$i = \frac{mg}{S_0} \cos(\theta) \qquad \text{Equation 22}$$

It is seen that the amount of current is small if the moving mass, m, is small and sensitivity, $S_0$, is large. Hence it is desirable to design a seismic sensor element with a small moving mass and large sensitivity. The design criteria proposed in the present disclosure are similar to the disclosed features of commonly-owned U.S. Pat. No. 7,099,235, the entire contents of which are hereby incorporated herein by reference.

For the circuit shown in FIG. 3A, the shunt resistor $R_s$ is designed or selected to cause critical damping. Voltage $E_0$ is applied through the shunt resistor $R_s$, to compensate the gravity force. Table 5 below shows the results of estimated required voltage, current and power consumption for electric levitation for a conventional seismometer, a conventional land geophone, a conventional downhole geophone, and a GAC sensor (high sensitivity geophone developed by Schlumberger) configured or designed for electric levitation according to the present disclosure.

TABLE 5

|  |  | Seismometer | Land Geophone | DH Geophone | GAC sensor |
| --- | --- | --- | --- | --- | --- |
| Open circuit damping | D0 [—] | 0.28 | 0.25 | 0.57 | 0.36 |
| Open circuit sensitivity | S0 [V/(m/s)] | 83.5 | 28.8 | 52 | 79 |
| Coil resistance | r [ohm] | 500 | 375 | 2400 | 1500 |
| Moving mass | m [kg] | 0.5 | 0.011 | 0.0078 | 0.00314 |
| Natural frequency | f0 [Hz] | 2 | 10 | 15 | 20 |
| Shunt resistance | Rs [ohm] | 1319 | 1333 | 14147 | 23260 |
| Total damping | D [—] | 0.7 | 0.7 | 0.7 | 0.7 |
| Coil current | Ic [A] | 0.0587 | 0.00374 | 0.00147 | 0.000390 |
| Supply voltage | E0 [V] | 106.81 | 6.39 | 24.32 | 9.64 |
| Power consumption | Power [W] | 6.271 | 0.024 | 0.036 | 0.004 |

It is seen that a large amount of power is required to levitate the moving mass of a low frequency seismometer; however, the power consumption for a high sensitivity seismic sensor is only 4 mW. Applicant recognized that seismic sensors having large open circuit sensitivity with small moving mass provide unexpected benefits in power consumption.

In the circuit diagram of FIG. 3A, a large percentage of power is consumed in the shunt resistor $R_s$. The amount of $R_s$ is larger than the r, i.e., the DC resistance of the moving coil. Therefore, a more efficient technique for injecting current is depicted in FIG. 3B wherein a seismic sensor with feedback is provided.

In the circuit if FIG. 3B, levitation voltage $E_L$ is applied to the input resistor $R_i$. The output voltage is:

$$E=rE_L/R_i \qquad \text{Equation 23}$$

The input of the operational amplifier is zero volt because of an imaginary short. The current in the moving coil, $E_L/R_i$, is the same current injected to the input resistor $R_i$. Hence, the circuit supplies a constant current determined by supply voltage $E_L$ and input resistor $R_i$ to the moving coil for any coil resistance r, and the current is constant even if r changes. One advantage of the circuit of FIG. 3B is that $R_i$ can be designed to be small so that voltage drop across the resistor is reduced. A shunt resistor $R_s$ may be added in parallel to the coil to control the damping factor of the seismic sensor operation.

For example, for $R_i$=100 ohms and a damping factor of 70%, the required current and power consumption were estimated for an electric levitation circuit such as shown in FIG. 3B, and the results are shown below in Table 6. As evident from Table 6 below the required power is reduced by 1/10 to 1/200 by utilizing the circuit depicted in FIG. 3B.

Applicant further noted that coil resistance changes with change in temperature. For example, for copper wire, the resistance is expressed as:

$$R=R_{20}\{1+0.00393(T-20)\} \qquad \text{Equation 24}$$

Figure 4A:
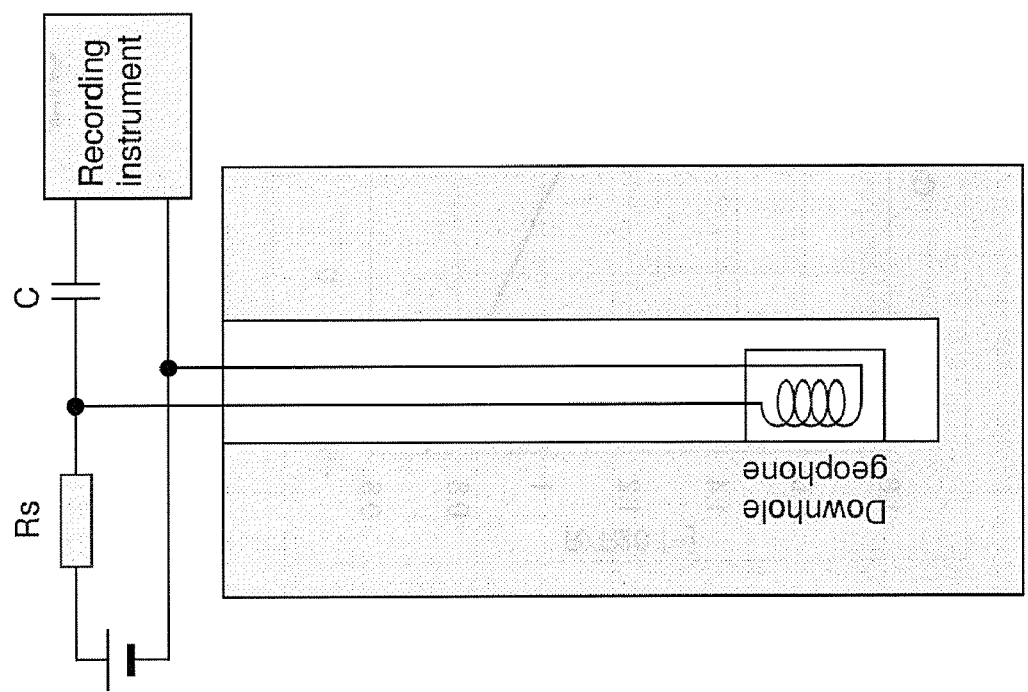
FIG. 4A is a schematic depiction of one possible system for downhole seismic monitoring in a high temperature environment with electric levitation to prevent seismic sensor spring creep according to the present disclosure.
Figure 4B:
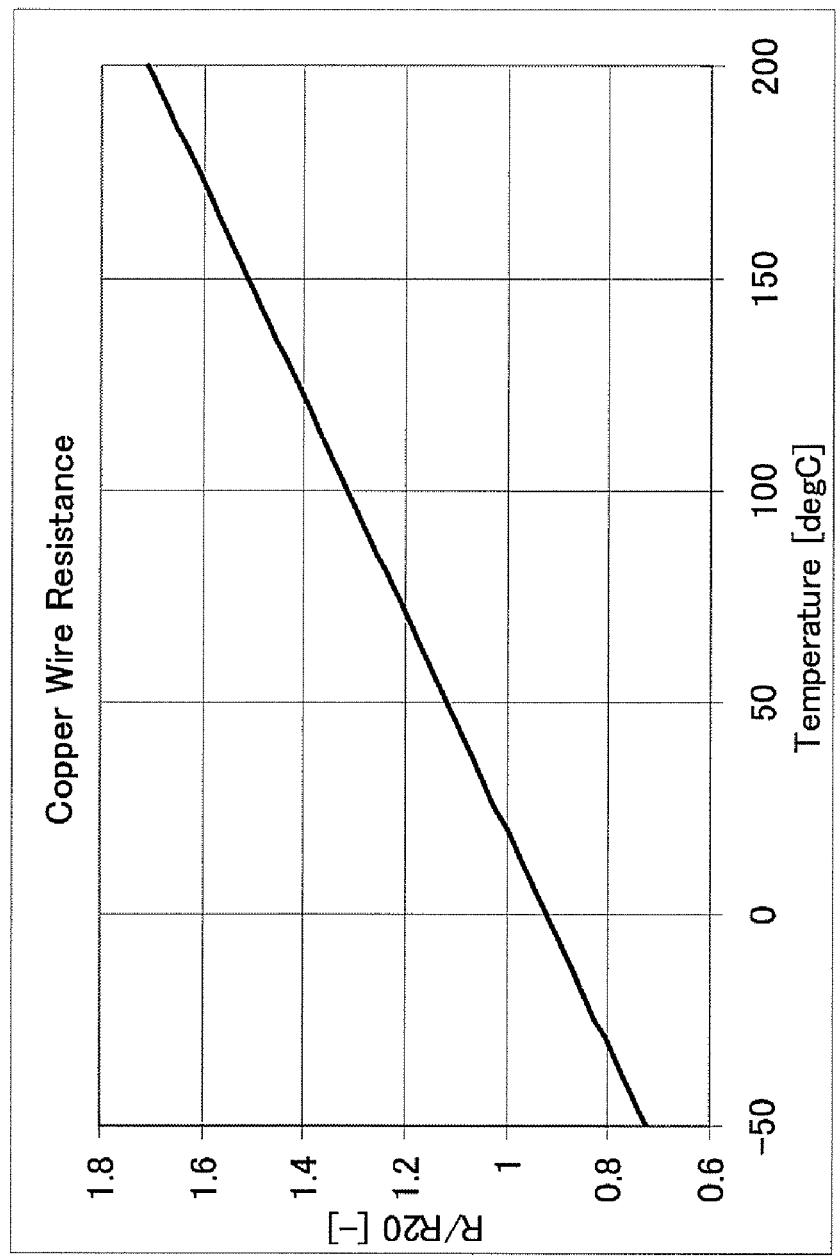
FIG. 4B is a graphical representation of the relationship between the resistance of a copper wire and temperature.

FIG. 4B is a graphical representation of the relationship between the resistance of a copper wire and temperature, i.e., the temperature coefficient. The resistance at 200 degrees Celsius is 1.8 times that at 20 degrees Celsius. In operational situations where the environmental temperatures keep changing, the downhole temperature can also change. For example, when an oil well is drilled, mud circulation cools the downhole formation. However, it takes a long time for the well temperature to become stable. Moreover, if oil is flowing in the well, the temperature fluctuates. Therefore, if voltage is applied to the moving coil of a seismic sensor via a shunt resistor, the current is a function of temperature, and the voltage needs to be trimmed with variation in temperature.

Figure 4C:
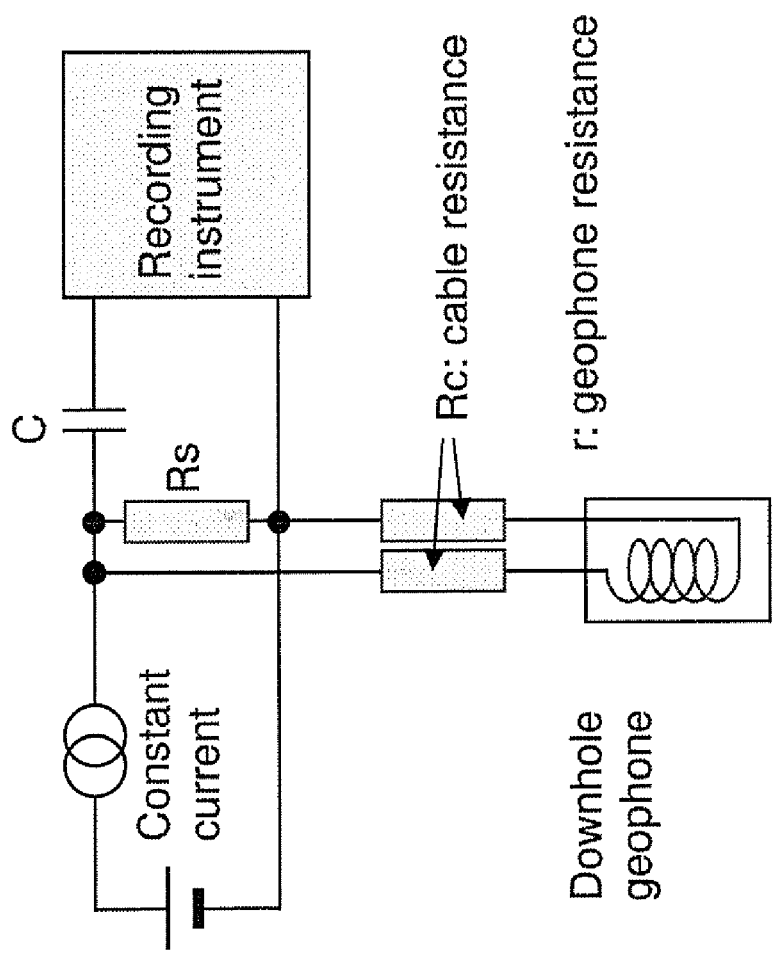
FIG. 4C is a schematic depiction of another possible system for seismic monitoring to overcome temperature dependencies of geophone coil resistance and cable resistance by supplying constant current according to the present disclosure.

If a seismic sensor that is deployed downhole is wired and signals are transmitted to the surface without amplifiers, the cable resistance is included in the moving coil resistance, and the amount of cable resistance also changes with change in temperature. To eliminate temperature effects, the electric power may be supplied in a constant current fashion, as depicted in the exemplary seismic system of FIG. 4C. In the case of FIG. 4C, the applied current is constant even if resistance changes, and levitation force is maintained constant.

The amount of electric levitation may be determined by knowing the moving coil position. One possible technique is to use a suitable displacement sensor for sensing the position

TABLE 6

|  |  | Seismometer | Land Geophone | DH Geophone | GAC sensor |
|---|---|---|---|---|---|
| Open circuit damping | D0 [—] | 0.28 | 0.25 | 0.57 | 0.36 |
| Open circuit sensitivity | S0 [V/(m/s)] | 83.5 | 28.8 | 52 | 79 |
| Coil resistance | r [ohm] | 500 | 375 | 2400 | 1500 |
| Moving mass | m [kg] | 0.5 | 0.011 | 0.0078 | 0.00314 |
| Natural frequency | f0 [Hz] | 2 | 10 | 15 | 20 |
| Shunt resistance | Rs [ohm] | 1319 | 1333 | 14147 | 23260 |
| Total damping | D [—] | 0.7 | 0.7 | 0.7 | 0.7 |
| Coil current | Ic [A] | 0.0587 | 0.00374 | 0.00147 | 0.000390 |
| Coil voltage | Ec [V] | 29.3538 | 1.4036 | 3.5280 | 0.5843 |
| Current in shunt | Is [A] | 0.0222 | 0.0011 | 0.00025 | 0.000025 |
| Total current | It [A] | 0.0810 | 0.0048 | 0.0017 | 0.0004 |
| Input resistance | Ri [ohm] | 100.0000 | 100.0000 | 100.0000 | 100.0000 |
| Supply voltage | E0 [V] | 8.10 | 0.48 | 0.17 | 0.041 |
| Power consumption | Power [W] | 0.655 | 0.00230 | 0.00030 | 0.000017 |

FIG. 4A is a schematic depiction of one possible system for downhole seismic monitoring at high temperature environments with electric levitation to prevent geophone spring creep according to the present disclosure. In the exemplary system of FIG. 4A, electric levitation is applied to seismic sensors that are deployed for long term monitoring of seismicity in, for example, a hot borehole. Since conventional electronics may not be reliable at high temperatures, the signals from the seismic sensors may be transmitted in analog fashion without the use of electronics. The levitation current may be applied by a battery through the shunt resistor $R_s$. The capacitor C blocks DC levitation voltage, and passes seismic signals to the recording instrument.

The present disclosure also contemplates that current may be applied to existing geophones that have previously been installed but might have become inoperative, i.e., "dead", because of spring creep. By injecting suitable current to the dead seismic sensors, it is possible to lift the moving coil from the bottom so that the seismic sensors are operative and may be used again for seismic survey operations.

of the moving mass. For example, an external inclinometer may be utilized. However, the moving coil center also may be determined by use of the step test method disclosed in commonly-owned co-pending U.S. patent application Ser. No. 12/180,560.

For verification of the levitation current, i.e., to check whether or not the injected current is sufficient, techniques disclosed in aforementioned U.S. patent application Ser. No. 12/180,560 may be utilized in combination with the electrical levitation techniques disclosed in the present disclosure. The entire contents of the aforementioned patent application are hereby incorporated herein by reference.

Figure 5:
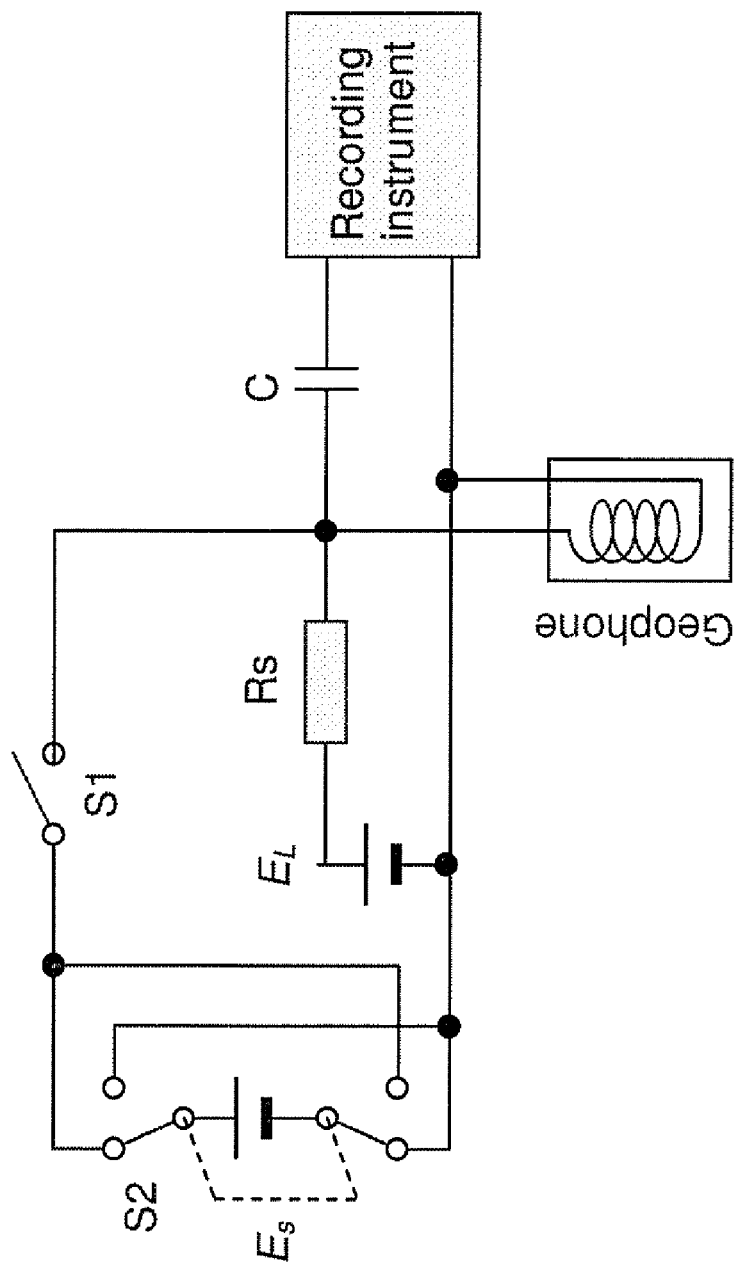
FIG. 5 is a circuit diagram representation of one technique disclosed herein for testing a seismic sensor for centralization of the moving coil with electric levitation according to the present disclosure.

FIG. 5 is a circuit diagram representation of one technique for testing a seismic sensor geophone for centralization of the geophone moving coil with electric levitation according to the present disclosure. In the technique of FIG. 5, a step test is integrated into a circuit of the present disclosure to measure the moving coil position and electric levitation current. In FIG. 5, $S_1$ is a switch for applying step voltage $E_s$, and $S_2$ is a switch to change the polarity of the step voltage. $E_s$ is selected so as to be large enough to displace the moving coil fully to the top maximum and bottom maximum of the housing of the seismic sensor. If the moving coil is located at the center of the housing, the step response from the top maximum position and step response from the bottom maximum position should be the same with reversed polarity. The difference, if any, is the amount of displacement of the moving coil from the center. It should be noted that the exemplary test circuit of FIG. 5 includes the shunt resistor, $R_s$, for applying electric levitation. The test includes the overall response of the seismic sensor with the shunt resistor, but not the open circuit response. The open circuit response may be measured by switching off the shunt resistor.

The present disclosure proposes two exemplary techniques for electrical levitation of seismic sensors. In one instance, DC current is applied to the seismic sensor based on an estimation of the levitation current using the geophone parameters, such as natural frequency, $f_0$, open circuit sensitivity, $S_0$, DC resistance, $r$, and moving mass, $m$. Another possible technique measures the moving coil position, and the position is tuned or adjusted electrically.

The amount of current required for electric levitation is:

$$i = \frac{mg}{S_0} \quad \text{Equation 25}$$

An error in balancing the gravitational force and the electric levitation is absorbed by the deformation of the spring element. If the spring element is weak, and moving mass is large, for example, in the case that $f_0$ is low, the deformation of the spring due to the balancing error becomes large (note FIG. 6). In such a case, the electric levitation current has to be determined with good accuracy. In this, the error in levitation current should be balanced with the deformation of the spring element, i.e., $S_0 \Delta i = k \Delta \xi$. By using Equations 2 and 25, the percentage error of spring deformation is found as:

$$\frac{\Delta i}{i} = \frac{\Delta \xi}{\xi_0} \quad \text{Equation 26}$$

where $\xi$ is the spring displacement and $\xi_0$ is the natural displacement of the spring element. The percentage error in the levitation current is the same as the percentage of error in the natural displacement.

Figure 6:
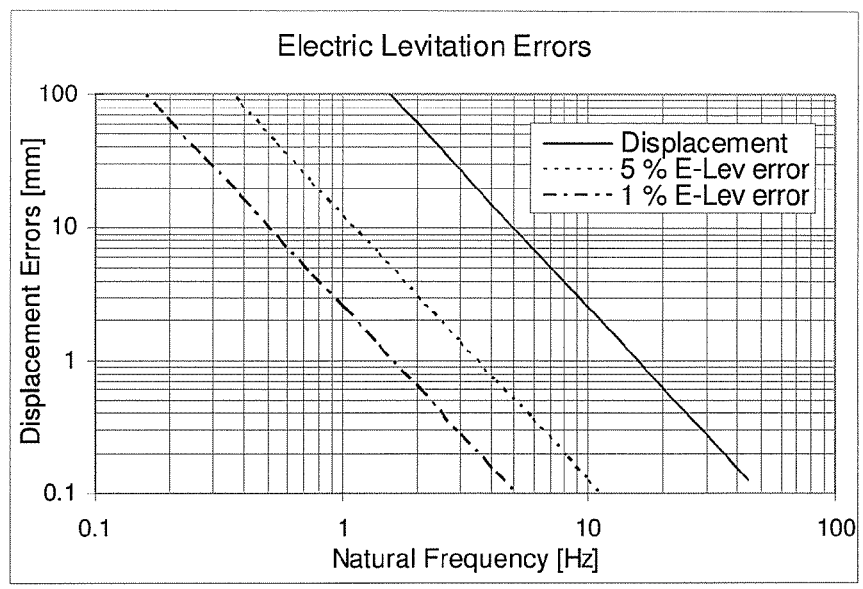
FIG. 6 is a graphical representation of errors in natural displacement after electrical levitation due to inaccuracy of levitation current and/or determination of geophone parameters.

FIG. 6 is a graphical representation of errors in coil centering after electrical levitation due to inaccuracy of levitation current and/or determination of geophone parameters. The spring displacement caused by the error in levitation current is shown in the graph of FIG. 6. If 95% of gravitational acceleration is compensated, the error is 1 mm for $f_0=4$ Hz. To achieve this result it may be possible to set the levitation current based on the specifications of the seismic sensor since tolerance is normally about 5%. To levitate, for example, a 1.5 Hz geophone within an error of 1 mm, the levitation current should be within an accuracy of 1%. In this, 1 mm displacement error may be the maximum tolerable error in a conventional geophone having a size of 1 inch in outer diameter (OD) and 1.2 inches in height (H).

For current estimation within 1% error high precision calibration of the seismic sensor is required. In this, the present disclosure proposes that a measured moving mass be used to determine the required amount of levitation current. Techniques for determination of the moving mass of a geophone are described in aforementioned commonly-owned U.S. Pat. No. 7,225,662.

FIGS. 7A-7D are circuit diagram representations of some techniques disclosed herein for DC cancellation in a geophone that is electrically levitated according to the present disclosure.

The levitation current that is injected to levitate a moving coil of a seismic sensor causes DC offset to the seismic signal measurement. One possibility is to block the DC signal by using a capacitor, as shown in FIGS. 4A, 4C and 5. However, such a blocking of the DC signal could also reduce the low frequency signals.

Figure 7A:
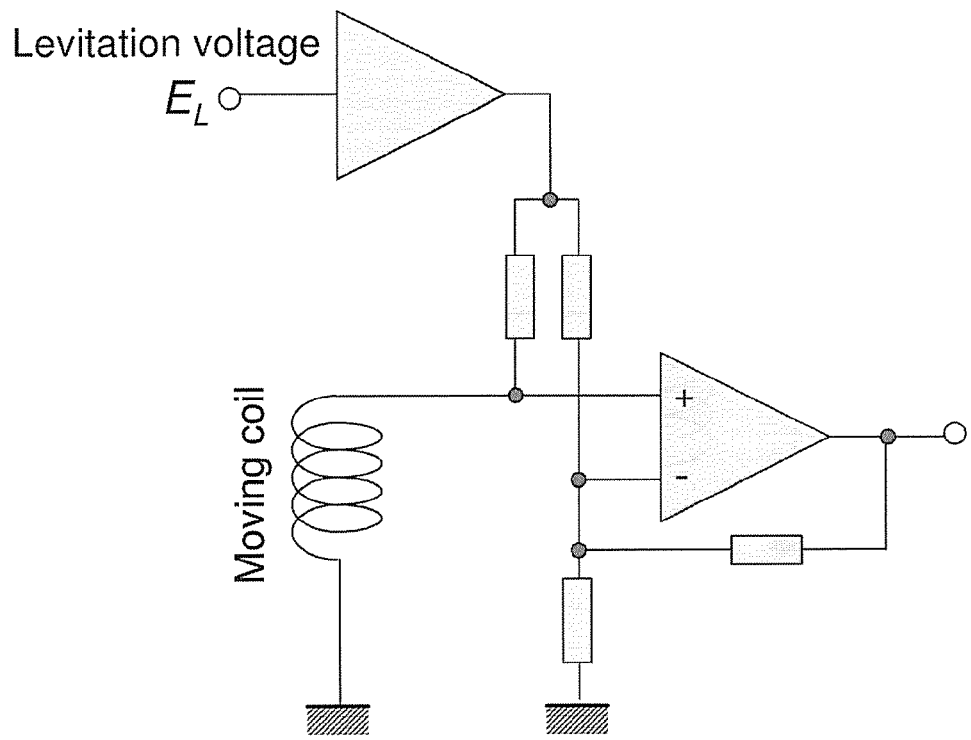
FIGS. 7A-7D are circuit diagram representations of some possible techniques for DC cancellation in seismic sensors that are electrically levitated according to the present disclosure.

FIG. 7A depicts one technique for removing DC offset caused by injection of a levitation current into a seismic sensor. In the circuit diagram of FIG. 7A, the same voltage that is provided to the moving coil for levitation is also applied to the negative input of the operational amplifier so that the voltage applied to the moving coil is cancelled. Since the same voltage is applied to both positive and negative inputs, any noise in the levitation current may also be cancelled.

Figure 7B:
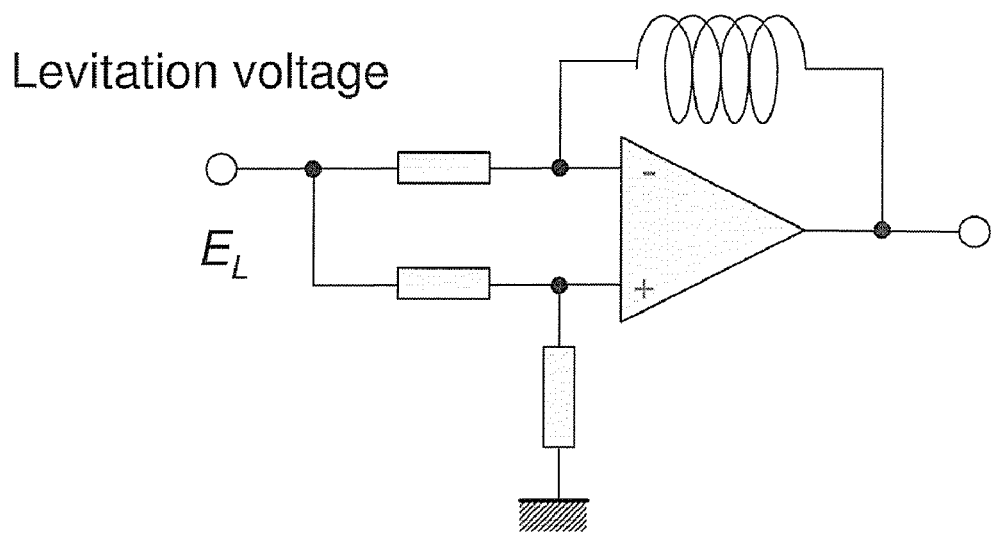

FIG. 7B depicts another possible technique for cancellation of DC signals for the levitation circuit depicted in FIG. 3B.

Figure 7C:
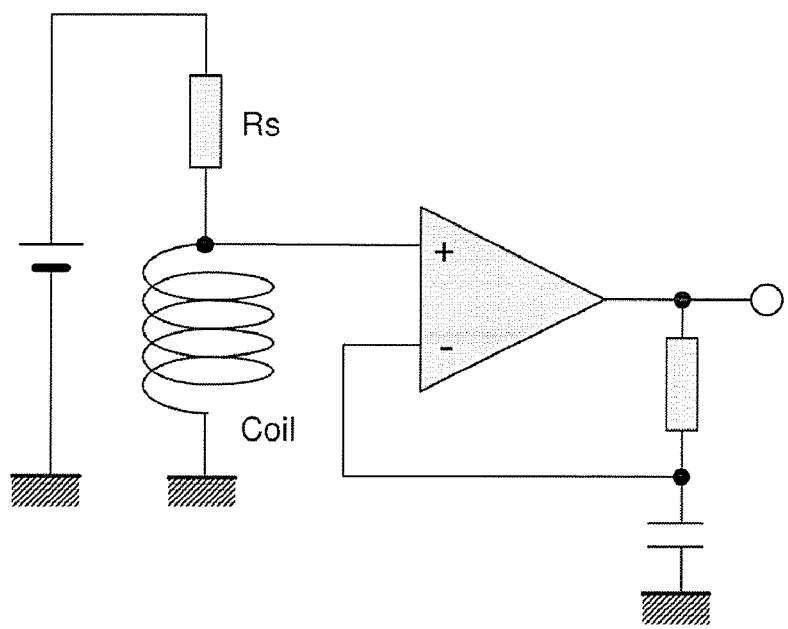
Figure 7D:
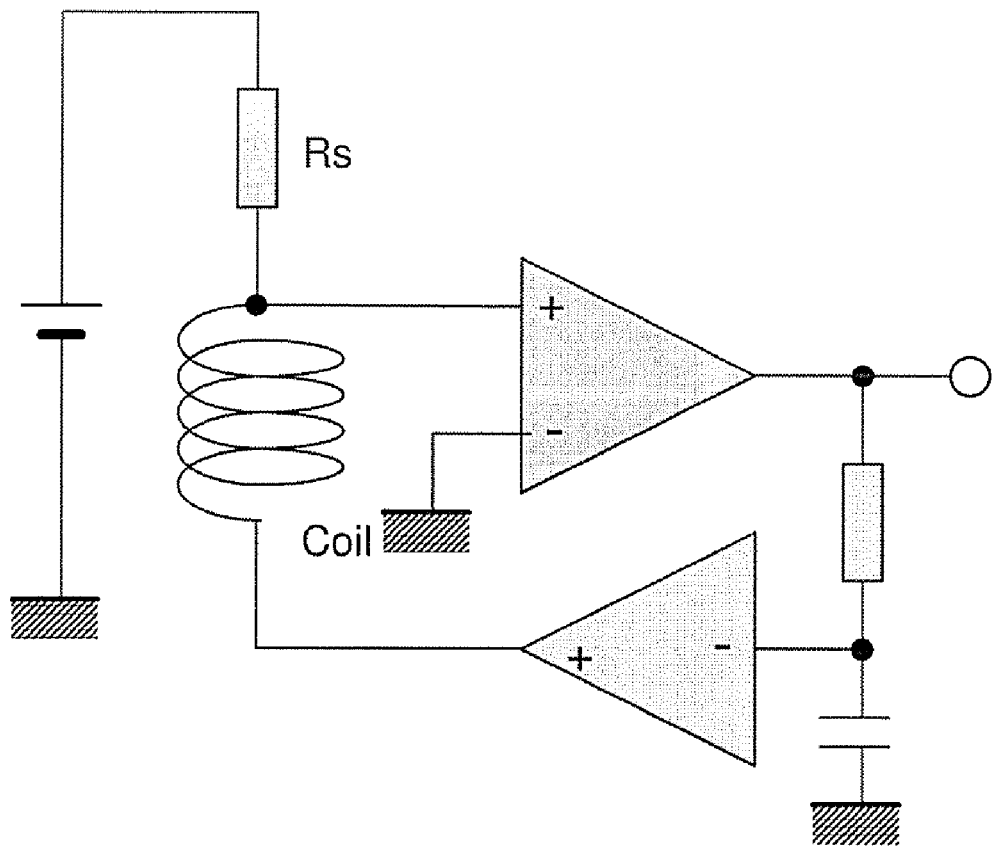

FIG. 7C depicts yet another possible technique for blocking DC components by using feedback of a filtered output. In the instance of FIG. 7C, the operational amplifier amplifies both the detected seismic signals and the levitation voltage. The seismic signals are filtered so that the very low frequency components remain. Feedback of the low frequency components is applied to the operational amplifier to remove the DC signals. The filtered output of the operational amplifier may be applied to the moving coil after reversing the polarity to retain zero DC voltage at the input of the operational amplifier, as depicted in yet another exemplary apparatus of FIG. 7D. Since only the DC component is fed back, the noise on the levitation current cannot be cancelled.

FIGS. 8A-8D are schematic depictions of some techniques disclosed herein for sensing the position of a moving coil in a geophone seismic sensor according to the present disclosure.

The present disclosure contemplates installing a displacement sensing element in a seismic sensor device so that it is possible to levitate the moving coil of the seismic sensor without determining the amount of the moving mass or other geophone parameters. In this, it is contemplated that a displacement sensor mechanism may be incorporated in the electrical levitation circuit diagrams of the present disclosure, as described in further detail below. Feedback of the displacement signals is applied to the moving coil with negative polarity so that the position signal pulls the moving coil to the opposite direction and the moving coil comes to the center of the geophone. In this, a servo accelerometer type arrangement may be used; however, in the present instance the position signals are filtered so that there is no feedback of the seismic signals, and the natural frequency does not change in the seismic frequency range.

Figure 8B:
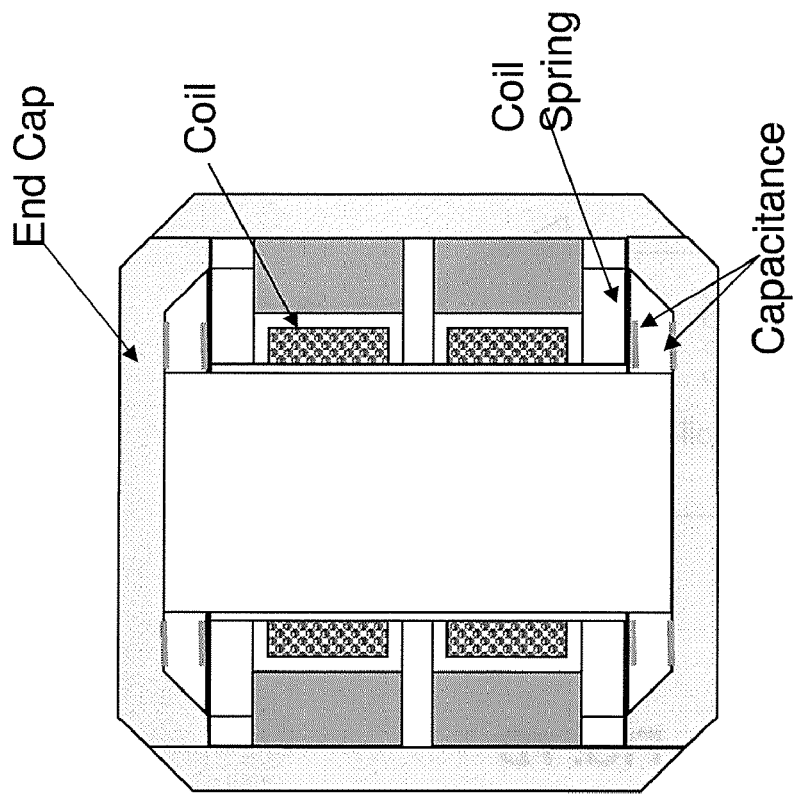
FIGS. 8A-8D are schematic depictions of some exemplary techniques for sensing the position of a moving coil in seismic sensors according to the present disclosure.
Figure 8A:
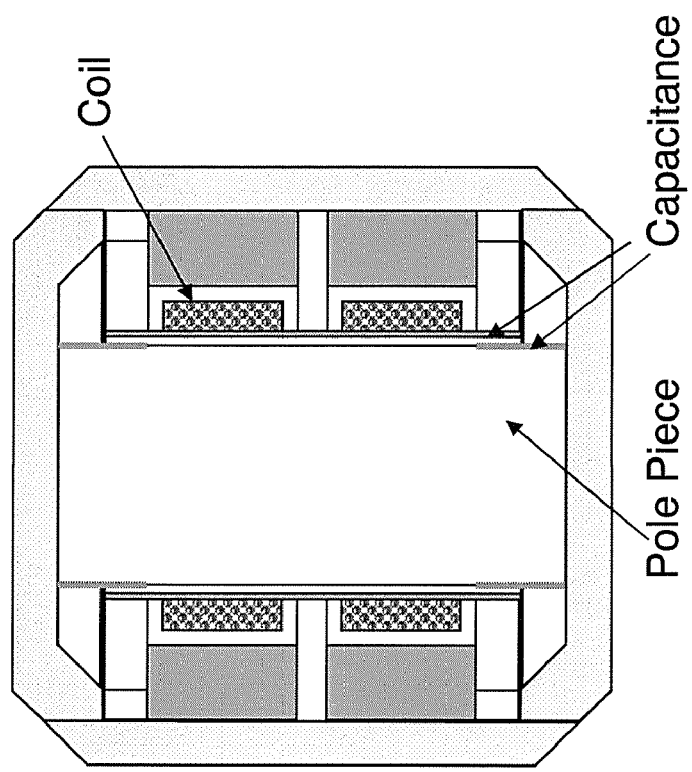

In the exemplary configuration of FIG. 8A, opposing capacitance elements are provided on the moving coil and the pole piece of a seismic sensor so as to be movable relative to each other. The distance between the electrodes remains the same; however, the amount of overlapping area changes according to the position of the moving coil. The arrangement of FIG. 8A may be utilized for seismic sensors having large displacement.

FIG. 8B depicts pairs of capacitance elements that are installed at upper and lower positions of the spring elements and on the end caps. If the moving coil is displaced by gravity, the coil moves down thereby reducing the separation between the lower capacitance elements so that the amount of capacitance from the lower capacitance elements is greater than the amount from the upper capacitance elements. It is to be noted that for low frequency seismic sensors the stroke of the moving coil is large, and the capacitance may be too small to determine the distance. However, such a configuration may be utilized in a geophone that works with over damped condition, such as disclosed in commonly-owned Japanese Patent No. P3098045.

Figures 8C, 8D:
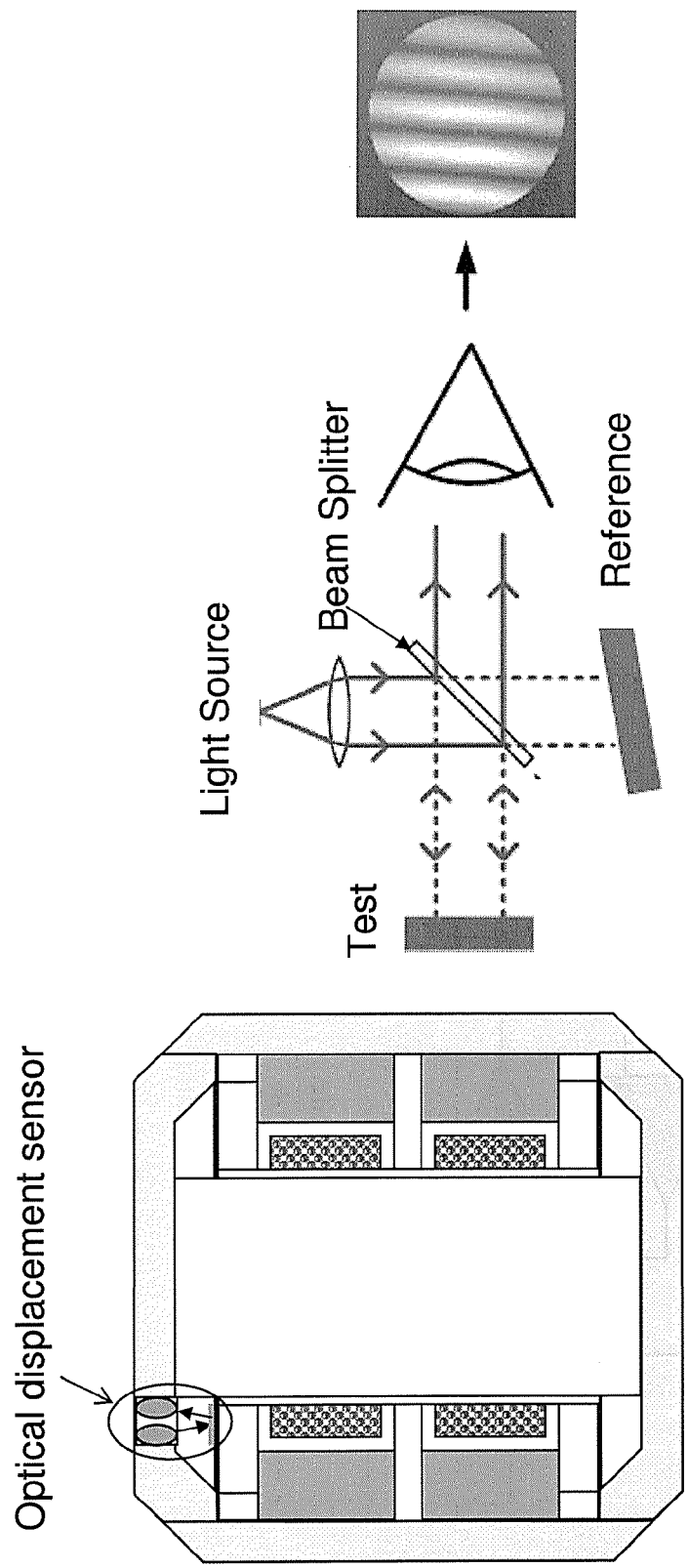

FIG. 8C depicts one implementation of an optical type position sensor. In one possible embodiment, the optical position sensor may be configured or designed using interferometer principles, such as schematically depicted in FIG. 8D.

In one possible embodiment, the optical transmitter sends light to a reflector mounted on the moving coil and an optical receiver receives the reflected signals. The transmitter and receiver may be arranged to make an optical interferometer, such as a Michelson's Interferometer. Since the measurement is based on optics, the measurement at low frequencies is absent of the 1/f noise.

If the displacement is large, there is a need to count interference fringes, which may be complicated. The optical displacement sensor can also be made to measure intensity of the reflected light. The intensity of the reflected light is small if the distance is large. The same optical sensor may also be mounted on the bottom cap so that the displacement measurement works in push-pull fashion. The position where the two optical detectors receive light of the same intensity is the center of the moving coil.

Figure 9A:
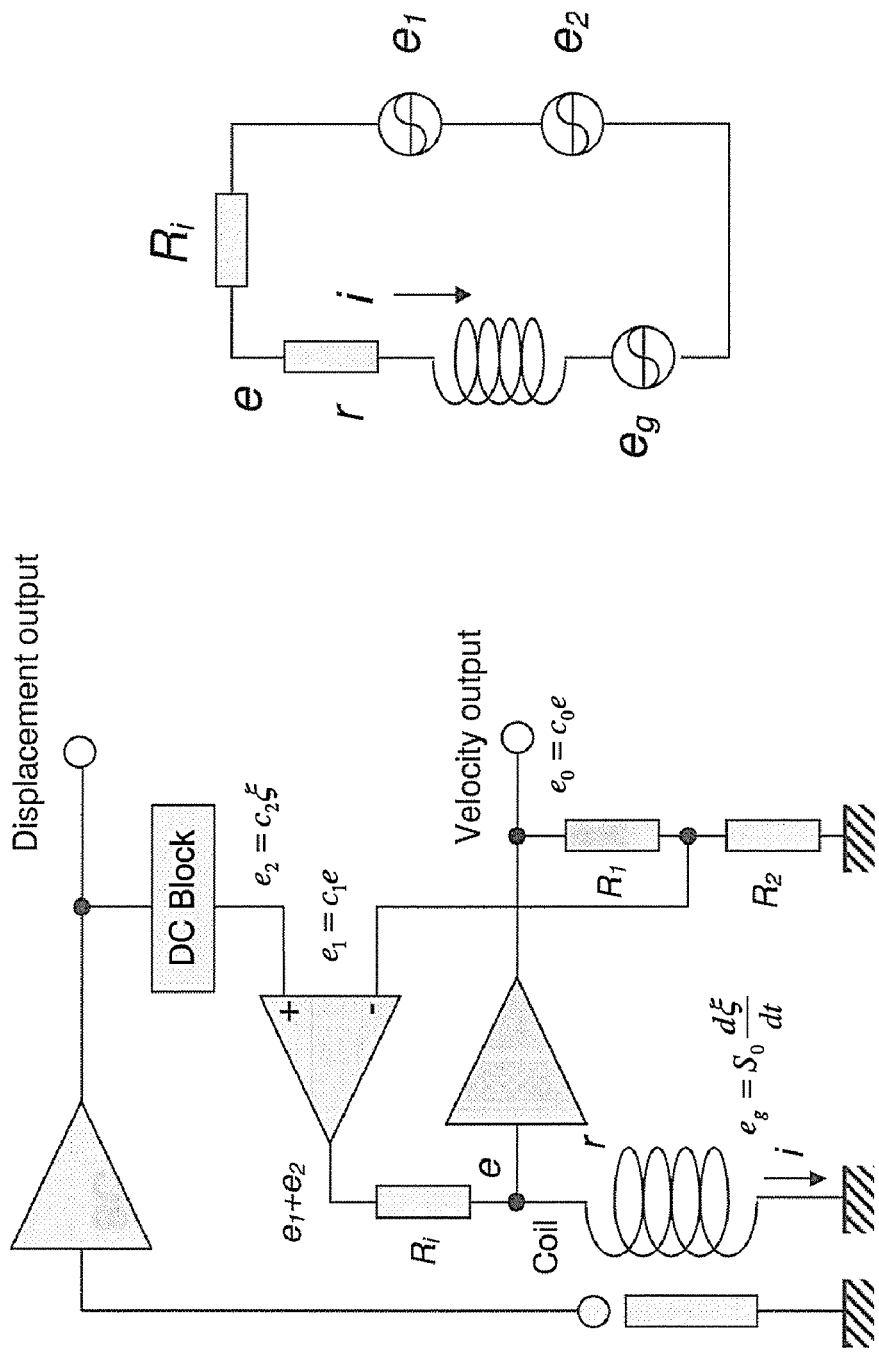
FIG. 9A shows circuit diagrams for some feedback techniques in seismic sensors systems according to the present disclosure.

FIG. 9A shows circuit diagrams depicting exemplary systems for a feedback seismic sensor according to the present disclosure. The applicant recognized that providing feedback current to the output of a seismic sensor would be a novel and efficient approach to using signals from the moving coil of the seismic sensor to improve the signal-to-noise ratio (SNR).

Aforementioned Japanese Patent No. P3098045 discloses the use of feedback to the negative input of an operational amplifier where the geophone is also connected. This circuit is know as an imaginary short. Feedback makes input voltage to zero so that the operational amplifier detects signals in current mode and applies maximum damping to the moving coil. In contrast, the circuit of FIG. 9A applies feedback to the positive input of the operational amplifier so that feedback current also flows into the moving coil of the seismic sensor that is outputting the seismic signals.

According to certain embodiments of the present disclosure, the electrical circuit may be further configured or designed to output velocity signals in a wide frequency range from about 0.01 Hz to about 1000 Hz. In this, the frequency range may be defined considering the noise level. In theory, the frequency range may be set at any desired level, but there is a limitation that is imposed by the noise. As one possibility, the present disclosure contemplates a seismic sensor having mechanical natural frequency ~4 Hz; natural frequency with displacement feedback=1 Hz; displacement signal roll off=0.1 Hz; and transformation=0.01 Hz.

In a servo accelerometer, the position feedback is negative to increase the stiffness of the spring, and the displacement signal is in proportion to the acceleration below the modified natural frequency. In contrast, the present disclosure proposes a new method in which positive position feedback is applied to soften the stiffness of the spring, as shown in FIG. 9A. The moving coil is used for a sensing coil and a feedback coil. The sensing coil is the primary means of measuring the seismic signals. It is possible to use a sensing coil and an independent feedback coil as suggested by U.S. Pat. No. 3,559,050 or U.S. Pat. No. 4,051,718; however, the sensitivity is reduced and extra terminal pins are required.

The input signal, e, is a sum of the output of the moving coil and the feedback signal. In FIG. 9A, the signal e is amplified and also feedback is applied to the moving coil to modify the damping factor. The equation of motion for the moving coil with feedback signals may be written as:

$$\frac{d^2\xi}{dt^2} + 2\omega_0 D_0 \frac{d\xi}{dt} + \omega_0^2 \xi = -\frac{d^2 u}{dt^2} + \frac{f}{m} \quad \text{Equation 27}$$

where f is the sum of electric forces acting on the moving coil. At the output of the coil, feedback currents and coil output are merged. The direction of the current is to flow into the coil. The feedback current is supplied through the resistor $R_i$. The moving coil generates output $e_g$. "r" is the resistance of the moving coil.

The sum of the output signal from the moving coil and feedback signals is:

$$e = \frac{R}{R+r} e_g + \frac{r}{R+r}(e_1 + e_2) \quad \text{Equation 28}$$

The output voltage is:

$$e_g = S_0 \frac{d\xi}{dt} \quad \text{Equation 29}$$

The amount of velocity feedback, which also includes displacement, is:

$$e_1 = c_1 e \quad \text{Equation 30}$$

where $c_1$ includes amplifier gain and amount of feedback. The displacement feedback is:

$$e_2 = c_2 \xi \quad \text{Equation 31}$$

where $c_2$ includes displacement sensitivity and amplifier gain. Equation 28 may be rearranged as:

$$e = \frac{R}{(R+r-rc_1)} e_g + \frac{r}{(R+r-rc_1)} e_2 \quad \text{Equation 32}$$

The electric force acting on the moving coil is:

$$f = -\frac{S_0^2(1-c_1)}{R+r(1-c_1)} \frac{d\xi}{dt} + \frac{S_0 c_2}{R+r(1-c_1)} \xi \quad \text{Equation 33}$$

Rewriting Equation 27 as:

$$\frac{d^2\xi}{dt^2} + 2D_0\omega_0 \frac{d\xi}{dt} + \omega_0^2 \xi = \\ -\frac{d^2 u}{dt^2} - \frac{S_0^2(1-c_1)}{m\{R+r(1-c_1)\}} \frac{d\xi}{dt} + \frac{S_0 c_2}{m\{R+r(1-c_1)\}} \xi \quad \text{Equation 34}$$

Equation 34 may be simplified with modified natural frequency and damping factor as:

$$\frac{d^2\xi}{dt^2} + 2D\omega_c \frac{d\xi}{dt} + \omega_c^2 \xi = -\frac{d^2u}{dt^2} \qquad \text{Equation 35}$$

where the modified damping factor D and the modified natural frequency $\omega_c$ are:

$$D = D_0 \frac{\omega_0}{\omega_c} + \frac{S_0^2(1-c_1)}{2m\omega_c\{R + r(1-c_1)\}} \qquad \text{Equation 36}$$

$$\omega_c^2 = \omega_0^2 - \frac{S_0 c_2}{m\{R + r(1-c_1)\}} \qquad \text{Equation 37}$$

A solution for Equation 27 may be found as:

$$\xi = \frac{-a\left(\frac{\omega}{\omega_c}\right)^2\left(1 - \frac{\omega^2}{\omega_c^2}\right)\sin(\omega t) + a\left(2D\frac{\omega}{\omega_c}\right)\left(\frac{\omega}{\omega_c}\right)^2 \cos(\omega t)}{\left\{\left(1 - \frac{\omega^2}{\omega_c^2}\right)^2 - \left(2D\frac{\omega}{\omega_c}\right)^2\right\}} \qquad \text{Equation 38}$$

The sine and cosine terms may be combined and Equation 38 may be expressed with amplitude and phase as:

$$\xi = \frac{a\left(\frac{\omega}{\omega_c}\right)^2}{\sqrt{\left\{1 - \left(\frac{\omega}{\omega_c}\right)^2\right\}^2 + \left(2D\frac{\omega}{\omega_c}\right)^2}} \sin(\omega t - \varphi) \qquad \text{Equation 39}$$

$$\tan(\varphi) = \frac{2D\frac{\omega}{\omega_c}}{1 - \left(\frac{\omega}{\omega_c}\right)^2}$$

Figure 9B:
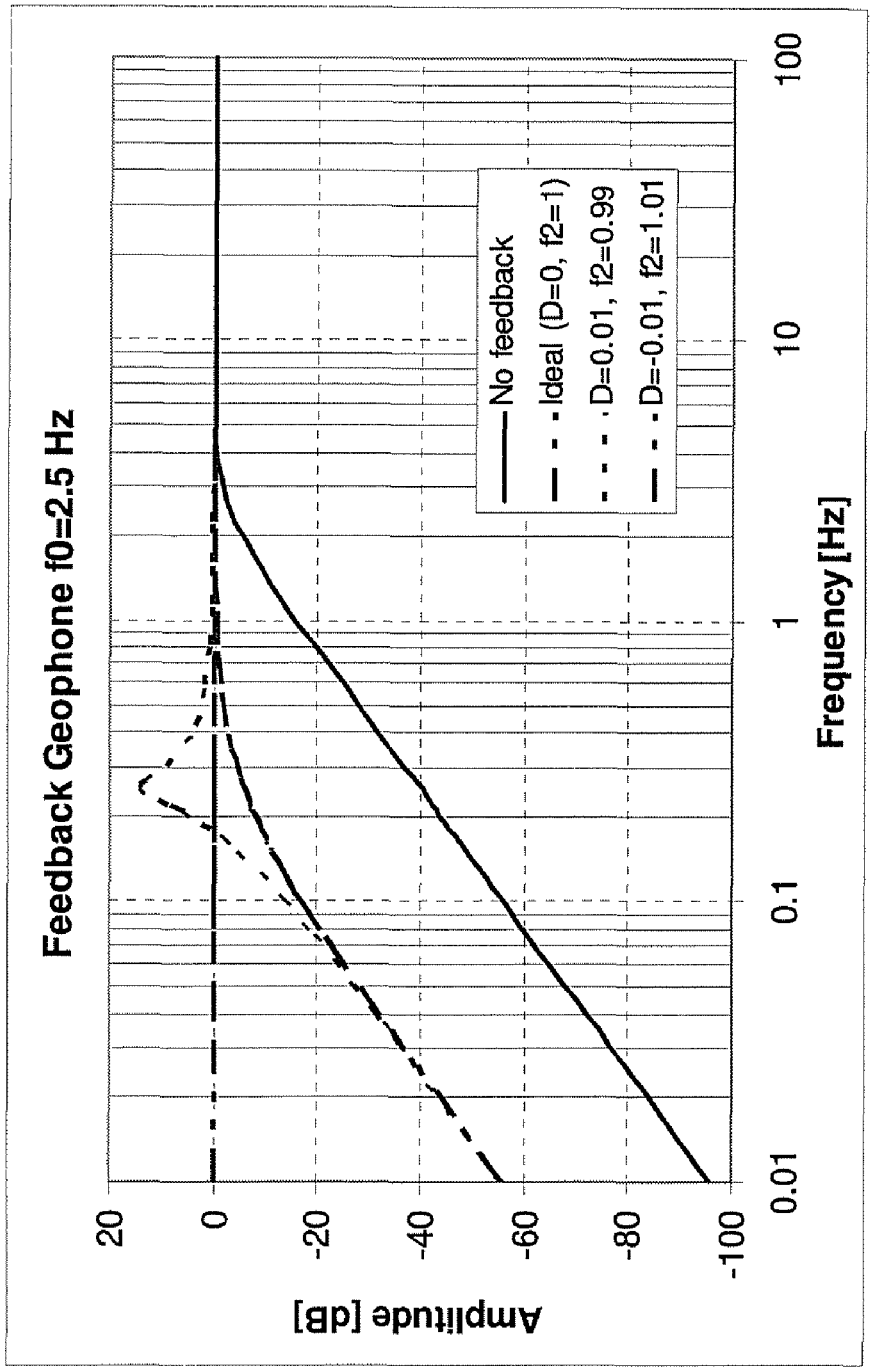
FIG. 9B is a graph showing simulated data for a feedback seismic sensor with ideal and no feedback, and the effects of errors in determining feedback parameters according to the present disclosure.

FIG. 9B is a graph showing simulated data for a feedback geophone seismic sensor with possible errors to determine feedback parameters according to the present disclosure. The response parameters of the geophone element are $f_0=4$ Hz, $D_0=0.3$. The natural frequency was modified to $f_c=1$ Hz and damping factor was modified to D=0.7 by feedback. It should be noted that if there is no displacement sensor, the displacement signal may be obtained by integrating the output of the signal from the moving coil.

Since a differentiation of ground displacement is:

$$v = \frac{du}{dt},$$

an integration of Equation 12 is:

$$\frac{d\xi}{dt} + 2\omega_0 D\xi + \omega_0^2 \int \xi dt = -v \qquad \text{Equation 40}$$

Equation 40 expresses that the weighted summation of velocity, displacement and integral of the displacement of the moving coil relative to the housing is equal to the velocity of the ground motion. The weight for the displacement is $2\omega_0 D$ and the weight for integral is $\omega_0^2$ as shown in Equation 40.

Figure 10:
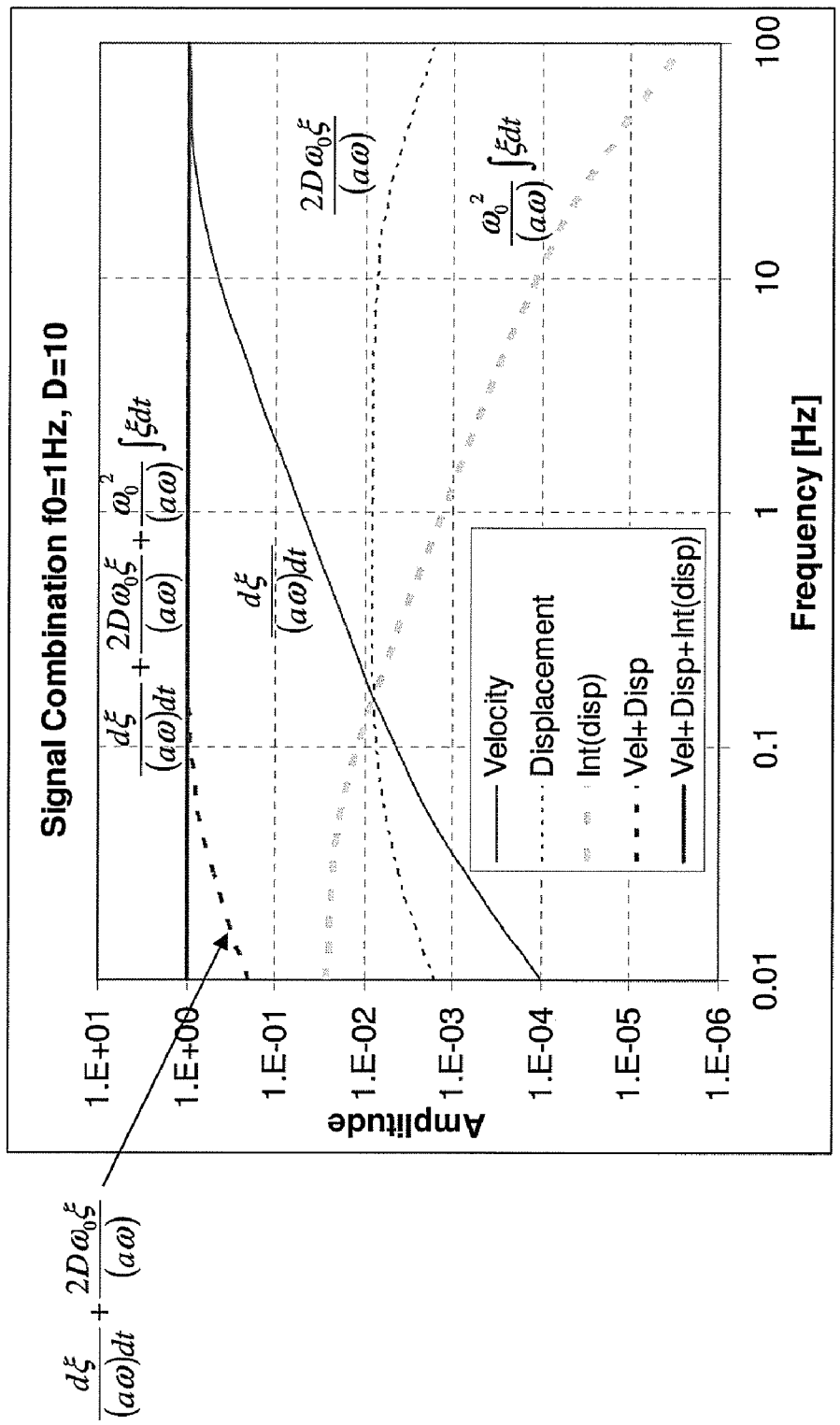
FIG. 10 is a graph showing simulated data for combined output data for a seismic sensor according to the present disclosure.

FIG. 10 is a graph showing combined output data for a seismic sensor according to the present disclosure. It is seen that the true ground motion is recovered by a proper summation of velocity, displacement and integral of displacement obtained from the motion of the moving coil. Practically, it is not possible to integrate the displacement at zero or near zero hertz because of the limited signal-to-noise ratio. To recover signals below the natural frequency, there is a need for an optimal way to combine velocity, displacement and integral of displacement without boosting noise. One possible way is to sum velocity and displacement to extend the low frequency velocity response, as shown in FIG. 10.

Another possible technique is to transform a geophone response to a desired geophone response. The present disclosure contemplates transforming the response of a geophone to a desired response to the extent that the signal-to-noise ratio permits. The low end of frequency can be set by considering the noise level. A geophone measures signals with a response of Geophone 1. The response of Geophone 1 is transformed to that of Geophone 2. The processing may be performed in frequency domain as:

$$v = IFFT\left(\frac{FFT(\text{Geophone2})}{FFT(\text{Geophone1})} FFT(\text{Signal})\right) \qquad \text{Equation 41}$$

Mathematically it is possible to apply such signal processing; however, it is desirable to do so in real-time. Real-time processing can also be used for a digital feedback system. It is possible to tune the feedback parameters in a laboratory or in a factory by replacing or trimming the resistors and capacitors, but it is difficult to design analog circuits that allow such modifications in the field, especially after deploying a seismic tool in a borehole. Real-time digital signal processing makes it possible to adjust parameters for feedback, trim output, and/or combine signals to maintain the final response function that is adapted to the changes of temperature and/or sensor orientation.

Early information is important for earthquake monitoring and warning. As soon as a large earthquake occurs, the earthquake signal is transmitted real-time to a computing center and early warning is issued immediately after the earthquake occurs. There is no time to record data and transform the signals. It is desired that the geophone calibrate itself and determine the transformation parameters, and output the required transformed signals. The systems and techniques of the present disclosure provide such real-time mechanisms for early detection and warning of earthquakes.

Figure 11:
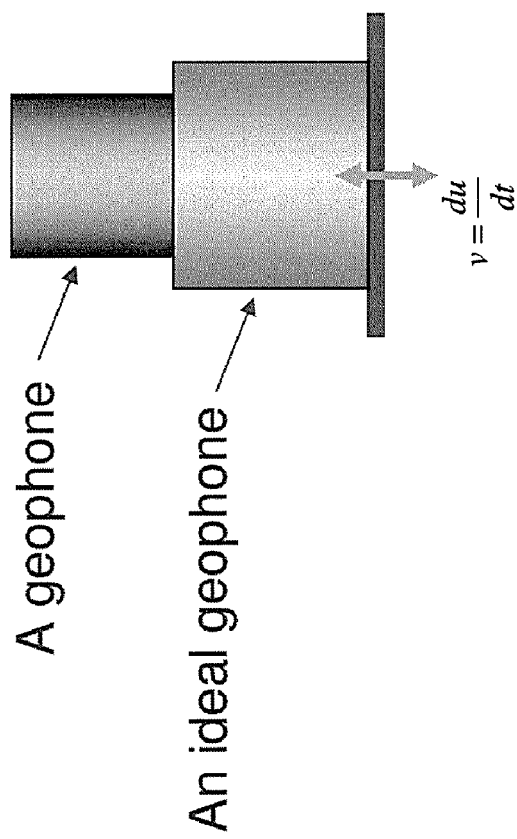
FIG. 11 is a schematic representation of a geophone sensor and an ideal geophone sensor to explain geophone calibration according to the present disclosure.

FIG. 11 depicts one method for calibrating a geophone response according to the present disclosure. In the technique of FIG. 11, it is assumed that there are two geophones responding to the same vibration. One is an ideal geophone and the other is any actual geophone. The responses of the two geophones are:

$$\frac{d^2\xi_a}{dt^2} + 2D_a\omega_a \frac{d\xi_a}{dt} + \omega_a^2 \xi_a = -\frac{d^2u}{dt^2} \qquad \text{Equation 42}$$

$$\frac{d^2\xi}{dt^2} + 2D\omega_0 \frac{d\xi}{dt} + \omega_0^2 \xi = -\frac{d^2u}{dt^2} \qquad \text{Equation 43}$$

where subscripts "a" denote the parameters for the ideal geophone. Since both geophones respond to the same motion, the left hand sides of the equations of motion for both geophones are the same:

$$\frac{d^2\xi_a}{dt^2} + 2D_a\omega_a\frac{d\xi_a}{dt} + \omega_a^2\xi_a = \frac{d^2\xi}{dt^2} + 2D\omega_0\frac{d\xi}{dt} + \omega_0^2\xi \quad \text{Equation 44}$$

Since the output signal from the actual geophone is $$e = S\frac{d\xi}{dt},$$

the moving coil motion $\xi_a$ of the ideal geophone in Equation 44 may be numerically computed by the output of the actual geophone. In other word, the signals detected by the actual geophone may be transformed to desired response signals.

Figure 12:
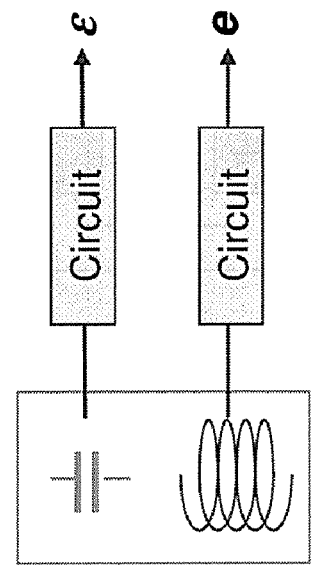
FIG. 12 is a schematic diagram to show one mass and spring system to output both displacement and velocity signals.

FIG. 12 depicts another method for acquiring a desired geophone response according to the present disclosure. If there is a displacement sensor to measure the displacement of the moving coil, the displacement sensor outputs displacement signals in parallel to the moving coil, as shown in FIG. 12. Both signals are originated from the same moving mechanism and the equation of motion is the same.

The displacement signal is $\epsilon=S_c\xi$. The displacement term in the right hand side of Equation 44 is found from the direct measurement of the displacement, velocity is determined by the velocity output from the coil and the acceleration term is evaluated by the differentiation of the velocity output. Then the moving coil motion $\xi_a$ in Equation 44 may be numerically computed real-time as the signals are digitized in terms of displacement signal and velocity signal from the sensor. Thus the velocity and displacement signals from the dual sensing element geophone are combined to represent velocity of an ideal geophone.

Figures 13A, 13B:
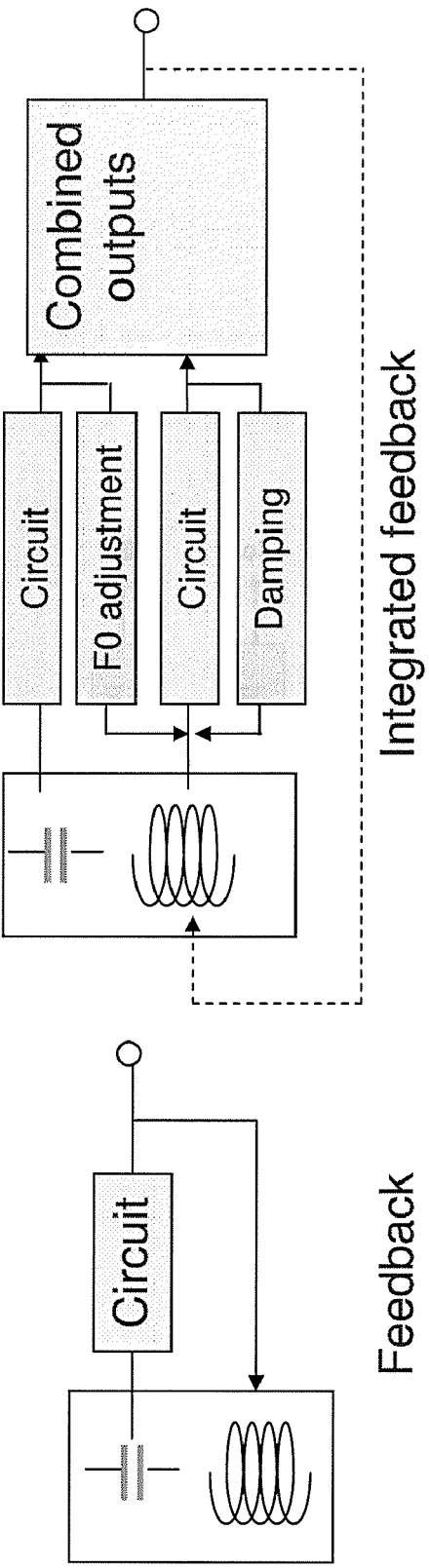
FIG. 13A is a block diagram representation of a conventional seismic sensor or a servo accelerometer having a force balance feedback loop.
FIG. 13B is a block diagram representation of a seismic sensor feedback loop system and combined displacement and velocity signals according to the present disclosure.

FIG. 13A is a block diagram representation of a conventional force balance accelerometer having a feedback loop. Feedback of the displacement signal is applied to the torquer coil to balance all forces including the gravitational force. The output signal is in proportion to acceleration and the natural frequency becomes higher than the frequency range of interest. Such an accelerometer is used to measure orientation, inclination or tilt of a device relative to gravity, since it generates voltage proportional to gravity. The noise becomes high at higher frequency.

FIG. 13B is a block diagram representation of a sensor feedback loop system according to the present disclosure. Feedback of the displacement signals (without DC) is applied to the moving coil to reduce the natural frequency positive feedback). Feedback of the velocity signal is applied to the coil to control the displacement (not to exceed the maximum of the coil movement due to seismic signals). In a small seismic sensor with low natural frequency, it is not possible to allow large movement of the coil because of the limitation of the housing size. For example, for a geophone having $f_0=0.5$ Hz, the natural displacement is 100 cm, and for a geophone having $f_0=5$ Hz the natural displacement is 1 cm. Since for a 7 inch casing the inner diameter (ID) is about 6 inches, a sensor package deployed with 3 inch tubing should have a diameter not exceeding about 2.5 inches. Therefore, to fabricate a 3-component sensor, the maximum outer diameter (OD) and height (H) are about 1.5 inches.

Referring again to FIG. 13B, the velocity and displacement signals are digitized and combined to output signals proportional to velocity in a wide frequency range. The displacement feedback and velocity feedback are controlled by the analog electronics in this design and parameters are fixed by fixed resistors and/or fixed capacitors. These parameters are trimmed in a factory or in a laboratory by calibrating the sensor element and subsequent modifications are difficult. There may be some errors in the trimming process and temperature variation may cause discrepancy between the sensor element response and feedback parameters. To compensate for such errors, feedback of the combined output is applied to the moving coil as an integrated feedback. The combination of velocity signal and displacement signal may also be modified accordingly to compensate for such errors. It is also possible to digitize displacement signals and velocity signals and apply the feedback digitally.

The present disclosure provides an apparatus for detecting seismic signals having simplified electronics to minimize noise in comparison with conventional seismic sensor apparatus. As described in further detail below, in one possible embodiment the apparatus of the present disclosure is configured or designed to combine velocity and displacement output signals and to include numerical processing.

Figure 14:
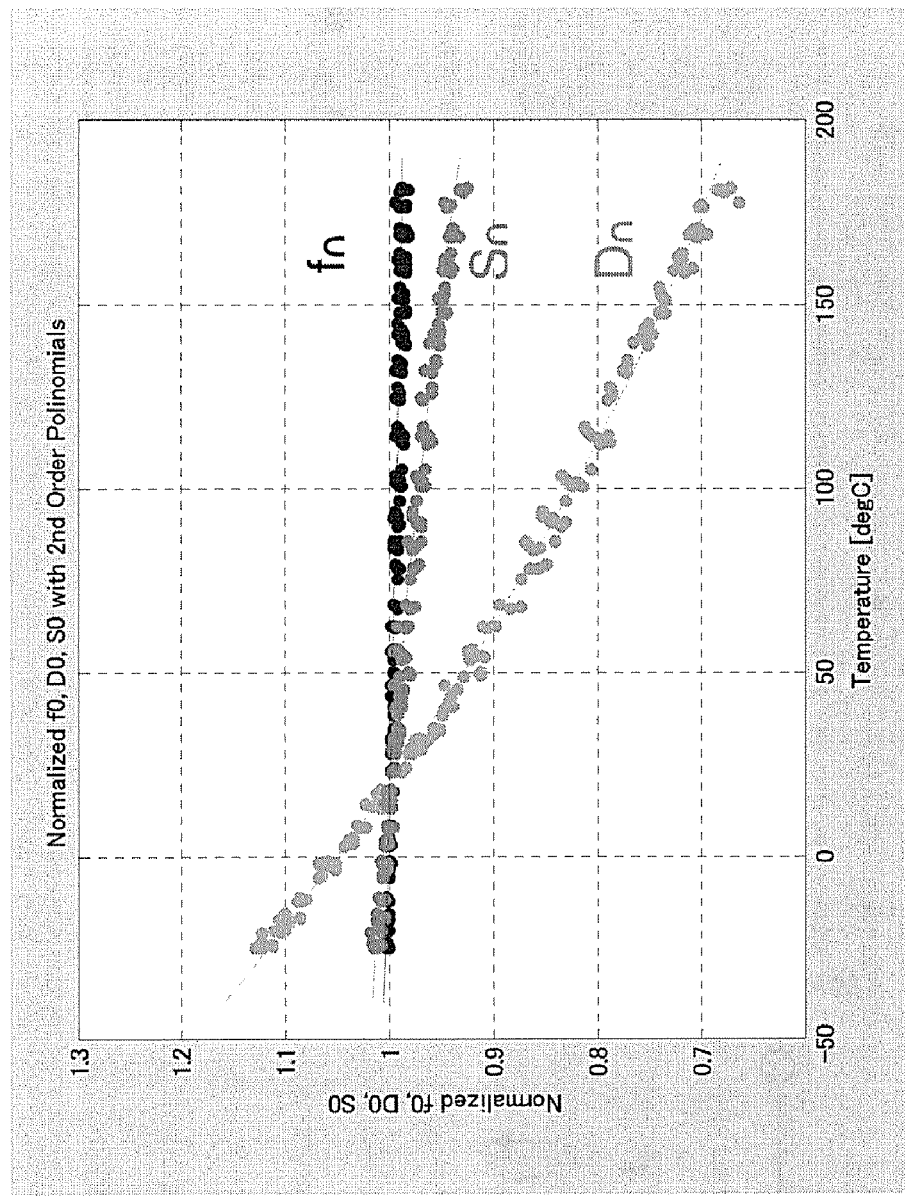
FIG. 14 is a graphical representation of the temperature dependence of geophone response parameters $S_0$, $D_0$, and $f_0$.

FIG. 14 is a graphical representation of the temperature dependence of geophone response parameters $S_o$, $D_o$, and $f_o$, for a test geophone. In this, as previously discussed, geophone parameters change with changing temperature as follows:

$$f_0(T)=f_0(20)(1.36\times10^{-7}\Delta T^2 - 9.63\times10^{-5}\Delta T+1)$$

$$D_0(T)=D_0(20)(3.39\times10^{-6}\Delta T^2 - 2.47\times10^{-6}\Delta T+1)$$

$$S_0(T)=S_0(20)(-4.93\times10^7\Delta T^2 - 3.12\times10^4\Delta T+1)$$

where $f_0(20)$ is the natural frequency, $D_0(20)$ is the damping factor, and $S_0(20)$ is the sensitivity evaluated at 20 degrees Celsius.

FIG. 14 shows an example of temperature effects on $f_0$, $D_0$, and $S_0$ to show how much they change with temperature compared to the values obtained at 20 degrees Celsius. The results indicate that an initial setting of feedback constants at room temperature is not desirable if the environmental temperature changes. Therefore, such calibration has to be performed periodically and the feedback parameters tuned according to the ambient temperature. Previously discussed U.S. Pat. No. 7,225,662 suggests measurement of DC resistance of a geophone coil to represent temperature of the geophone at the working condition.

Figure 15:
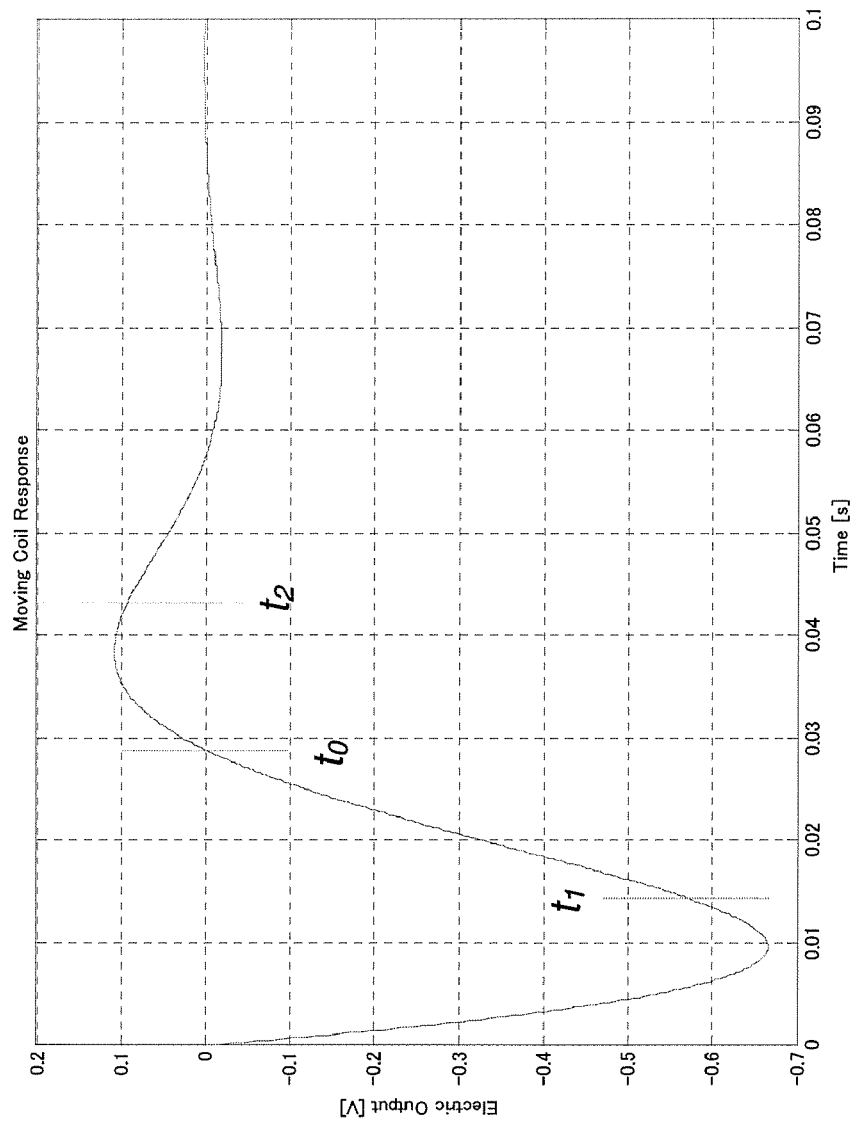
FIG. 15 depicts one conventional technique discussed herein for calibrating seismic sensors according to the present disclosure.
Figure 15:
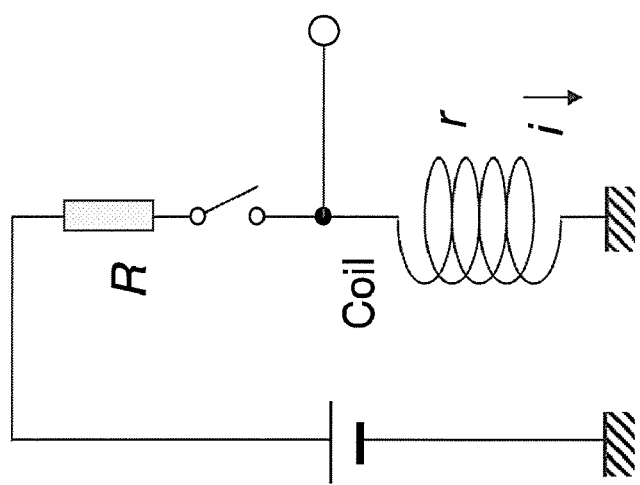

FIG. 15 is a representation of one technique disclosed herein for calibrating a geophone according to the present disclosure. To apply feedback or to sum the output signals to extend the low frequency response, the constants should be derived based on the geophone parameters. The error affects the over all frequency response. Calibration may be performed to set precise feedback constants. Such a calibration function is implemented in existing broadband seismometers. The present disclosure contemplates that a simple calibration may be performed by applying a step pulse. The moving coil is lifted by applying a DC voltage. Removing the DC voltage causes natural oscillation of the moving mass, as shown in FIG. 15. From the natural oscillation, the geophone parameters are estimated. This is a technique that is used to calibrate a geophone.

Figure 16A:
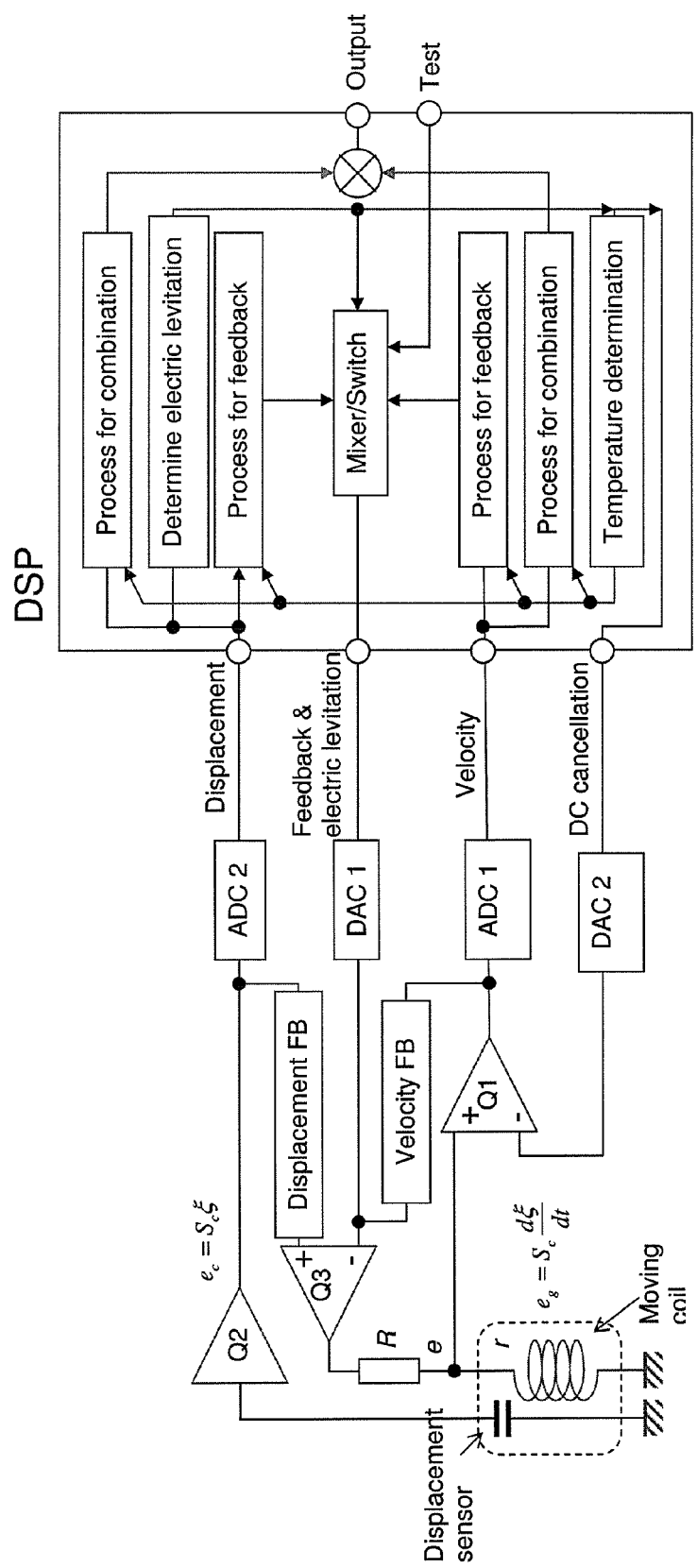
FIG. 16A is a block diagram representation of one possible system having seismic sensors according to the present disclosure.

FIG. 16A shows an integration or combination of electrical levitation, DC cancellation, feedback geophone, combined outputs, and temperature monitoring. The seismic sensor is arranged in a negative feedback of the operational amplifier Q1, as shown in FIG. 16A. The operational amplifier Q1 amplifies moving coil signals and Q2 converts signals from the displacement sensor output to electric signals proportional to displacement. Displacement FB blocks DC or near DC components of displacement signals and applies positive feedback to reduce the natural frequency. Velocity FB determines gain for the negative velocity feedback to control the maximum displacement. The feedback amplifier Q3 combines displacement feedback and velocity feedback signals, and injects corresponding current to the moving coil through the resistor R. The signals for displacement and velocity feedbacks are determined by calibrating the sensor element. The detailed trimming of the feedback can be done in a factory by calibrating the sensor element. Q3 also allows feedback and electric levitation signals from the digital signal processor (DSP).

The positive displacement feedback lowers the mechanical natural frequency and negative velocity feedback adjusts the total damping factor. The displacement and velocity signals are digitized and input to the DSP. The DSP computes displacement and velocity data in real-time, and combines both data to output data in a desired response. After the sensor installation, by knowing the orientation of the sensor, the initial electric levitation may be set as $I=mg/S_0 \cos(\theta)$. The DSP monitors DC component of the displacement data and calculates electric levitation voltage. The DSP outputs the electric levitation voltage data to the DAC 1 and Q3 adds the electric levitation voltage to the feedback system. The DSP calculates DC resistance, r, from the levitation voltage $E_0$ and DC level of the displacement output $E_c$ and feedback resistance R, $$r = \frac{E_c}{(E_0 - E_c)} R \qquad \text{Equation 45}$$

Since the resistance of the moving coil is known at temperature of 20 degrees Celsius, the temperature of the sensor element is:

$$T = \frac{1}{0.00393}\left(\frac{r}{r_{20}} - 1\right) + 20 \qquad \text{Equation 46}$$

By knowing the operating temperature the DSP recalculates processing parameters for signal combination according to actual response parameters at in-situ temperature (note again FIG. 14). This adjustment of the processing parameters can be performed continuously to adapt to temperature changes. It is difficult to adjust feedback parameters in hard wired electronics, but the adjustment may easily be done digitally. In addition to the signal combination, the adjustment of electric feedback can also be applied as a total feedback. It is also possible to adjust geophone response parameters by using an external temperature sensor attached to the housing or implemented in the sensor element.

Figure 16B:
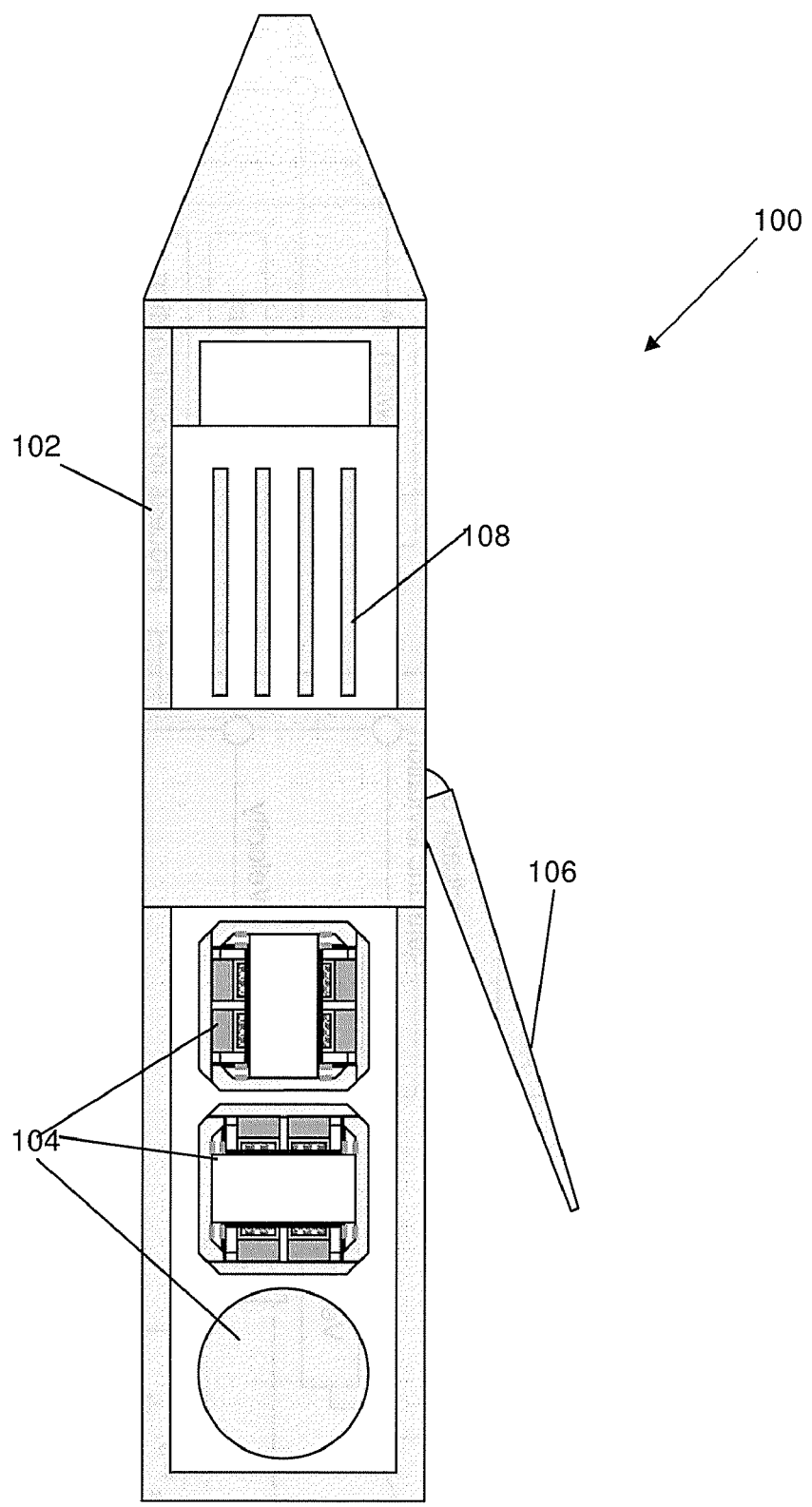
FIG. 16B depicts one exemplary borehole tool having seismic sensors according to the principles of the present disclosure.

FIG. 16B depicts one possible borehole tool 100 having a housing 102 with a plurality (three are depicted in FIG. 16B) of seismic sensors 104 according to the principles of the present disclosure arranged in the borehole tool 100. An arm or locking mechanism 106 is provided to stabilize/lock the tool 100 after deployment in a borehole. Electrical circuitry 108 configured or designed according to the present disclosure provides the necessary functionality for the tool 100. The electronics associated with the borehole tool 100 include feedback circuits, analog-to-digital converter (ADC), circuitry to combine signals, digital signal processor (DSP), and telemetry circuits. The exemplary borehole tool depicted in FIG. 16B provides the functionality and operations that are discussed in the present disclosure for purposes of oilfield seismic survey operations. In this, other associated surface and downhole systems may be connected with the borehole tool 100 as desirable or necessary. Such associated components of an oilfield seismic survey system are not described in detail herein since they are known to those having ordinary skill in the art.

The outer diameter (OD) of typical borehole seismometers is about 180 mm. To install such a seismometer, a special borehole needs to be drilled. In the oil field industry, the upper section of a well is typically cased with a 9⅝ inch casing and the lower section is cased with a 7 inch casing. To install a seismometer in such casing size, the tool OD should be less than 3⅜ inches. Smaller boreholes are desirable to reduce drilling cost and it is advantageous to have a 2½ inch tool. This requires that the overall diameter of a sensor should be within 50 mm. The sensors should be oriented in three directions, one vertical and two horizontals (note again FIG. 166B). From such requirement, the maximum OD and height of a sensing element should be 40 mm with a tapered top and bottom. In such a sensing element size, the practical movable space may on the order of +/−3 mm. Furthermore, the wells in an oil field may not be vertical, most likely deviated and possibly horizontal. A typical seismometer only works within +/−3 degrees of tilt. A special mechanism is required to gimbal such a sensing element. The principles of the present disclosure, for example, as represented in the exemplary borehole tool of FIG. 16B, provide novel and effective mechanisms for addressing such needs and requirements in oilfield seismic surveying.

Figure 16C:
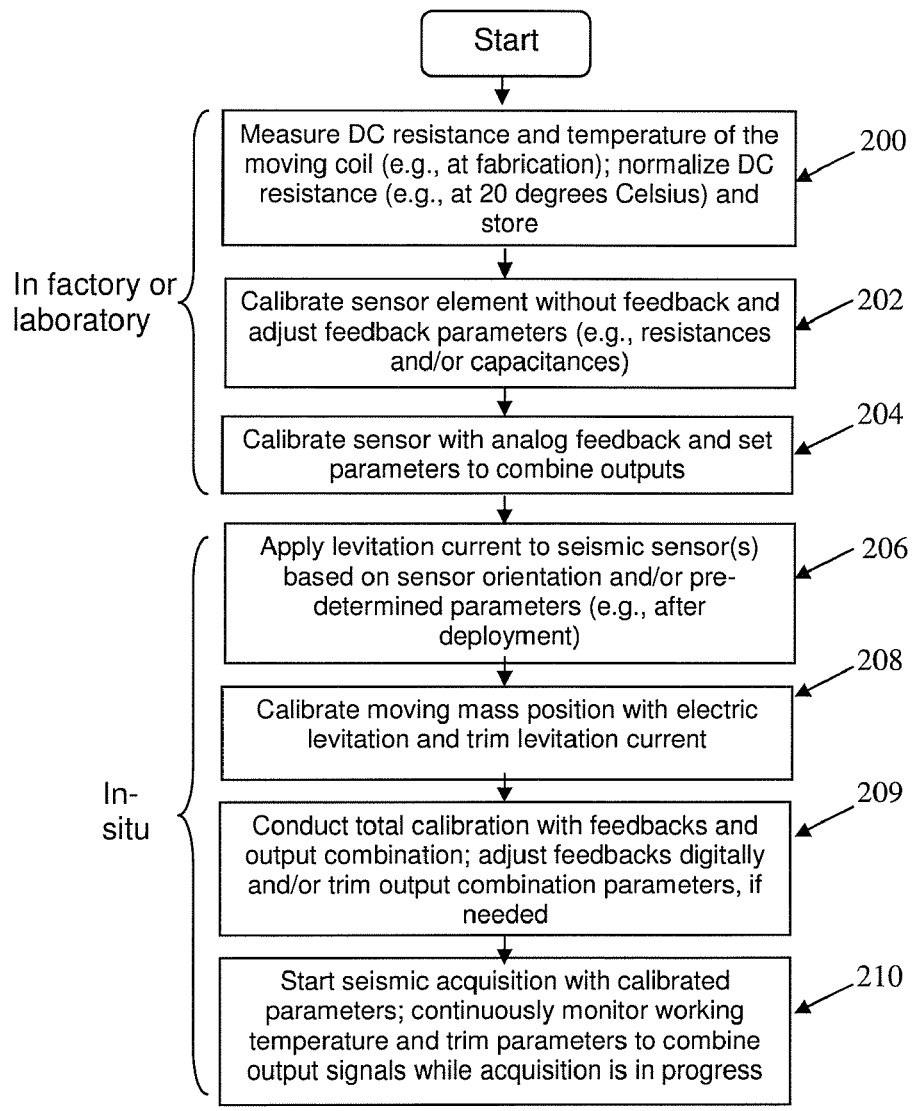
FIG. 16C is a flowchart of one possible method for seismic signal detection utilizing seismic sensors according to the present disclosure.

FIG. 16C is a flowchart of one possible method for seismic signal detection utilizing seismic sensors according to the present disclosure. The flowchart of FIG. 16C represents an integrated digital feedback seismic sensor according to the present disclosure. DC resistance and temperature of the moving coil are measured in a factory or laboratory, for example, at fabrication, and the DC resistance is normalized, for example, at 20 degrees Celsius, and stored (Step 200). The sensor element is calibrated without feedback and the feedback parameters, for example, resistances and/or capacitances, are adjusted (Step 202). The sensor is calibrated with analog feedback and the parameters to combine outputs are set (Step 204).

In-situ, for example, downhole in a borehole or after deployment at a seismic surveying location, levitation current is applied to the seismic sensor(s) based on sensor orientation and/or pre-determined parameters (Step 206). Moving mass position is calibrated with electric levitation and the levitation current is trimmed (Step 208). Total calibration with feedbacks and output combination are conducted; feedbacks are adjusted digitally and/or output combination parameters are trimmed, if needed (Step 209). Seismic acquisition is started with calibrated parameters while continuously monitoring working temperature, and parameters to combine output signals are trimmed while acquisition is in progress (Step 210).

The output data are continuously monitored to monitor the DC component and to adjust the electrical levitation and the DC compensation. The temperature of the seismic sensor is estimated from the DC component. The feedback parameters and combination parameters are updated (note Step 210 in FIG. 16C).

Generally, the techniques disclosed herein may be implemented on software and/or hardware. For example, they can be implemented in an operating system kernel, in a separate user process, in a library package bound into network applications, on a specially constructed machine, or on a network interface card. In one embodiment, the techniques disclosed herein may be implemented in software such as an operating system or in an application running on an operating system.

A software or software/hardware hybrid implementation of the present techniques may be implemented on a general-purpose programmable machine selectively activated or reconfigured by a computer program stored in memory. Such a programmable machine may be implemented on a general-purpose network host machine such as a personal computer or workstation. Further, the techniques disclosed herein may be at least partially implemented on a card (e.g., an interface card) for a network device or a general-purpose computing device.

The embodiments and aspects were chosen and described in order to best explain the principles of the invention and its practical applications. The preceding description is intended to enable others skilled in the art to best utilize the principles described herein in various embodiments and with various modifications as are suited to the particular use contemplated. It is intended that the scope of the invention be defined by the following claims.

What is claimed is:

1. A system for use in seismic signal detection, comprising:
   at least one electrically levitated seismic sensor, comprising:
      a housing;
      at least one magnet for creating a magnetic field mounted within the housing; and
      a moving coil within the housing structured and arranged so as to be fixed in a radial direction relative to the housing and movable in an axial direction thereof;
   an electrical circuit configured or designed for providing an electrical signal to the seismic sensor, the electrical circuit being adapted to provide a positive feedback signal to an output of the seismic sensor to reduce a natural frequency of the seismic sensor, the positive feedback signal being indicative of a displacement of the seismic sensor;
   a digital signal processor in communication with the seismic sensor;
   a set of instructions executable by the processor that, when executed:
      applies the electrical signal to the seismic sensor such that the moving coil is levitated against gravitational force so as to be located at a central position relative to the magnetic field in the seismic sensor.

2. A system according to claim 1, wherein the electrical circuit comprises a shunt resistor to adjust movement of the moving coil of the seismic sensor.

3. A system according to claim 1, wherein the electrical circuit is further configured or designed to adjust movement of the moving coil by velocity feedback.

4. A system according to claim 1, wherein the electrical circuit is further configured or designed to provide integrated feedback to the seismic sensor.

5. A system according to claim 1, wherein the digital signal processor is configured or designed to monitor electrical signals output from the seismic sensor to derive temperature of the seismic sensor and to compensate sensor parameters for temperature dependency during acquisition of seismic data by the seismic sensor.

6. A system according to claim 1, wherein the electrical circuit is further configured or designed to supply a constant current to the moving coil of the seismic sensor.

7. A system according to claim 1, wherein the seismic sensor is configured or designed for downhole use in a borehole.

8. A system according to claim 1, wherein the seismic sensor is configured or designed for permanent or semi-permanent installation in seismic signal detection.

9. A system according to claim 1, wherein the seismic sensor is configured or designed for long term deployment in high-temperature environments in excess of about 125 degrees Celsius.

10. A system according to claim 1, wherein the levitation force is constant.

11. A system according to claim 1, wherein the seismic sensor is configured or designed for low frequency seismic signal detection downhole in a borehole.

12. A system according to claim 11, wherein the seismic sensor is omni-tiltable without gimbaling.

13. A system according to claim 1, wherein the electrical circuit is further configured or designed for measuring position of the moving coil during levitation.

14. A system according to claim 13, wherein the system is further configured or designed for real-time adjustment of a levitation voltage to maintain location of the moving coil based on the measured position of the moving coil.

15. A system according to claim 1, wherein the seismic sensor further comprises a position sensor within the housing configured or designed to sense position of the moving coil.

16. A system according to claim 1, wherein the electrical circuit is further configured or designed to compensate for one or more of DC offset and noise due to a levitation current.

17. A system according to claim 1, wherein the system is further configured or designed to provide an output signal comprising a combination of velocity and displacement signals output from the seismic sensor.

18. A system according to claim 17, wherein the electrical circuit is further configured or designed to output velocity signals in a wide frequency range.

19. A system according to claim 1, wherein the system is further configured or designed to calibrate the seismic sensor for temperature variations.

20. A seismic sensor according to claim 1, wherein natural frequency ($f_o$) of the moving coil of the seismic sensor is from about 0.5 Hz to about 5 Hz and outer diameter (OD) and height (H) of the seismic sensor housing are less than about 1.5 inch.

21. A system for use in seismic signal detection, comprising:
   at least one seismic sensor, comprising:
      a housing;
      at least one magnet for creating a magnetic field mounted within the housing; and
      a moving coil within the housing structured and arranged so as to be fixed in a radial direction relative to the housing and movable in an axial direction thereof;
   an electrical circuit configured or designed for providing an electrical signal to the seismic sensor;
   a digital signal processor in communication with the seismic sensor;
   a set of instructions executable by the processor that, when executed:
      applies the electrical signal to the seismic sensor,
   wherein the system is configured or designed to continuously monitor DC resistance of the moving coil of the seismic sensor while detecting seismic signals to derive a seismic sensor temperature, and to compensate sensor parameters based on variations in the seismic sensor temperature.

22. A system according to claim 21, wherein the system is further configured or designed to compensate sensor parameters for temperature variations during seismic signal detection.

23. A system according to claim 21, wherein the digital signal processor is further configured or designed to process signal data in real-time.

24. A system for use in seismic signal detection, comprising:
- at least one seismic sensor, comprising:
    - a housing;
    - at least one magnet for creating a magnetic field mounted within the housing; and
    - a moving coil within the housing structured and arranged so as to be fixed in a radial direction relative to the housing and movable in an axial direction thereof; and
- at least two sensing elements configured or designed to generate a first signal based on velocity measurements and a second signal based on displacement measurements of the seismic sensor, respectively, wherein the system is configured or designed to combine the first signal and the second signal to generate a combined output signal.

25. A method for seismic signal detection, comprising:
- deploying at least one seismic sensor, comprising:
    - a housing;
    - at least one magnet for creating a magnetic field mounted within the housing; and
    - a moving coil within the housing structured and arranged so as to be fixed in a radial direction relative to the housing and movable in an axial direction thereof;
- sensing seismic signals with the seismic sensor;
- generating a first signal based on velocity measurements and a second signal based on displacement measurements of the seismic sensor; and
- combining the first signal and the second signal to generate a combined output signal.

* * * * *